United States Patent
Kataoka et al.

(10) Patent No.: US 7,263,959 B2
(45) Date of Patent: Sep. 4, 2007

(54) CONTROL APPARATUS OF INTERNAL COMBUSTION ENGINE

(75) Inventors: Kenji Kataoka, Susono (JP); Yasushi Kusaka, Susono (JP); Hiroki Tasaki, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/541,453

(22) PCT Filed: Jan. 23, 2004

(86) PCT No.: PCT/JP2004/000611

§ 371 (c)(1),
(2), (4) Date: Aug. 18, 2005

(87) PCT Pub. No.: WO2004/067949

PCT Pub. Date: Aug. 12, 2004

(65) Prior Publication Data

US 2006/0048734 A1    Mar. 9, 2006

(30) Foreign Application Priority Data

Jan. 27, 2003    (JP)    ............... 2003-017562
Jan. 31, 2003    (JP)    ............... 2003-023820

(51) Int. Cl.
 *F02N 11/04*    (2006.01)
 *F02D 29/06*    (2006.01)
(52) U.S. Cl. ............... 123/179.4; 701/112; 290/31
(58) Field of Classification Search ............ 123/179.4, 123/179.5; 172/179.3; 290/31, 38 R, 38 B; 701/112

See application file for complete search history.

(56) References Cited

U.S. PATENT DOCUMENTS

| 4,364,343 | A | * | 12/1982 | Malik | ............... | 123/179.4 |
|---|---|---|---|---|---|---|
| 6,032,632 | A | * | 3/2000 | Bolenz et al. | ............ | 123/179.3 |
| 6,098,584 | A | * | 8/2000 | Ahner et al. | ............. | 123/179.3 |
| 6,098,585 | A | * | 8/2000 | Brehob et al. | ............ | 123/179.5 |
| 6,250,270 | B1 | * | 6/2001 | Ahner et al. | ............. | 123/179.3 |
| 6,418,899 | B1 | * | 7/2002 | Bluemel et al. | ......... | 123/179.3 |
| 6,453,864 | B1 | * | 9/2002 | Downs et al. | ............ | 123/179.3 |
| 6,581,559 | B1 | * | 6/2003 | Grob et al. | ............... | 123/179.3 |
| 6,593,713 | B2 | * | 7/2003 | Morimoto et al. | .......... | 318/139 |

(Continued)

FOREIGN PATENT DOCUMENTS

DE    100 50 170 A1    4/2002

(Continued)

*Primary Examiner*—Stephen K. Cronin
*Assistant Examiner*—Arnold Castro
(74) *Attorney, Agent, or Firm*—Oliff & Berridge, PLC

(57) ABSTRACT

At a time of stopping an internal combustion engine, inertia energy of the engine is kept constant, for example, by controlling a number of engine revolution constant, while controlling combustion of the engine. By utilizing the controlled inertia energy, the engine is stopped at a predetermined crank angle position. Since the engine is stopped at the predetermined crank angle position by utilizing the controlled inertia energy, a large amount of energy for controlling the stop position of the energy is not needed, and the energy needed for the stop control can be reduced. Since the inertia energy utilized for the stop control is always controlled in a predetermined state, the engine can be stopped at a proper position reliably each time.

19 Claims, 23 Drawing Sheets

U.S. PATENT DOCUMENTS 6,647,955 B1 * 11/2003 Sieber ..................... 123/322
2005/0115534 A1   6/2005 Tsuji et al.

FOREIGN PATENT DOCUMENTS

| DE | 101 23 037 A1 | 11/2002 |
|----|---|---|
| EP | 1 136 696 A1 | 9/2001 |
| FR | 2 824 873 | 11/2002 |
| JP | A 60-205064 | 10/1985 |
| JP | 11-107891 A * | 4/1999 |
| JP | A-H11-107793 | 4/1999 |
| JP | A 2001-342876 | 12/2001 |
| JP | A-2002-4985 | 1/2002 |
| JP | A 2002-004985 | 1/2002 |
| JP | A 2000-283010 | 10/2002 |

* cited by examiner

CONTROL APPARATUS OF INTERNAL COMBUSTION ENGINE

TECHNICAL FIELD

The present invention relates to a control apparatus of an internal combustion engine. Particularly, the present invention relates to a stop and start control for stopping the internal combustion engine at a position at which energy needed at the time of starting is the smallest, and at the same time, for executing early start of the engine by igniting fuel introduced and sealed in a specific cylinder at the time of starting.

BACKGROUND ART

Recently, there is known an engine stop and start control apparatus for automatically stopping an internal combustion engine (hereinafter, also referred to as "engine") when the vehicle stops and for automatically restarting the engine to start the vehicle when an instruction to start is given in the stopped state, in order to reduce a fuel consumption amount and exhaust gas during idling, from the viewpoint of environmental conservation, resources and energy saving or the like. This control is also called "idling stop" or the like.

It is known that, when the idling stop is automatically carried out, it is effective to control the stop position of the engine in order to minimize required energy at the time of starting the engine. Minimizing the required energy at the time of starting the engine brings about the advantages that an engine starting device used after idling stop such as a motor generator (MG) can be miniaturized, and the useful life of a battery can be elongated by reducing the electric energy.

As a method for controlling the stop position of the engine, there are proposed methods for executing fuel cut when a specific cylinder comes to a position of a predetermined crank angle, and for stopping the engine at a predetermined position by setting a predicted value of a compression torque at the time of stopping the engine and by producing a counter torque equivalent to the predicted compression torque to establish a balance.

Also, there is proposed an engine start apparatus in which the starter is rotated in a normal direction after the engine stop, and if the crank angle is at the crank angle stop position at which the starting torque of a starter becomes large, the crankshaft is rotated in a reverse direction to a crank angle stop position at which a starting torque becomes small before the next engine start, thereby improving the starting performance at the time of starting the engine. This method is disclosed in the Japanese Patent Application Laid-Open under No. 2000-283010.

Further, there is known the engine start apparatus for executing the next engine start by combusting the fuel in the cylinder supplied during the expansion stroke at the time of the engine stop. This method is disclosed in the Japanese Patent Application Laid-Open under No. 2002-4985.

However, in the method for executing the fuel cut at the predetermined crank angle for the specific cylinder in order to stop the engine at the predetermined position, since the states of engine loads of auxiliary machines and the like at the time of executing the fuel cut and the number of engine revolution immediately before the fuel cut are not always constant, the falling manner of the number of the engine revolution after executing the fuel cut until actual stopping of the engine may vary. No matter how small it may be, such a variation finally brings about a large accumulated difference. Consequently, it is practically difficult that the engine stop position is always controlled in a constant manner.

In the method for controlling the engine stop position by utilizing the balance with the compression torque at the time of stopping the engine, first, it is difficult to accurately predict the value of the compression torque. This is because the value of the compression torque is affected by an air amount leaking out via a piston ring and is varied by the speed of the vehicle. Further, a large motor is needed because a large torque has to be produced in order to balance with the compression torque, and hence the power consumption becomes large.

In the method for moving the crank angle to the position at which the starting torque becomes small by utilizing the motor after stopping the engine, since a large torque is needed to rotate the crankshaft after stopping the engine, a large motor is needed, after all.

On the other hand, as to the start control of the engine, by controlling the engine stop position, the necessary torque at the time of starting can be small and a motor for the engine start used at the time of idling stop can be miniaturized, as explained above. However, as the motor for starting is miniaturized, the possible output torque becomes small. As a result, there occurs a problem that the time until the completion of the first explosion of the engine becomes long.

Also, when the motor for starting is miniaturized, falling of the torque when the number of engine revolution increases becomes large. This is especially remarkable in a low voltage battery about 12V. Therefore, even if a piston of the cylinder in the compression stroke can get over the first compression stroke top dead center by the motoring by the starter motor, the piston may not get over the next compression stroke top dead center because enough inertia energy of the engine cannot be generated due to the decreasing outputting torque of the starter motor when the number of engine revolution increases. In the worst case, the motor may lock around the top dead center.

Further, there may also occur a problem that the time until the completion of the first explosion becomes long because it takes considerable time to determine the cylinder when the number of engine revolution is low.

DISCLOSURE OF THE INVENTION

The present invention is contrived in view of the above-described problems, and its object is to provide a control apparatus of an internal combustion engine capable of accurately stopping the engine at a predetermined stop position with small energy. Another object of the present invention is to provide a control apparatus of an internal combustion engine for realizing early ignition start of the internal combustion engine.

According to one aspect of the present invention, there is provided a control apparatus of an internal combustion engine including: a combustion control unit which controls combustion of the engine at a time of stopping the engine; an inertia energy control unit which controls inertia energy of the engine to be in a predetermined state; and a stop control unit which stops the engine at a predetermined crank angle position by utilizing the inertia energy.

The above-described control apparatus controls the combustion of the engine and controls the inertia energy of the engine to be in a predetermined state at the time of stopping the internal combustion engine. By utilizing the inertia energy thus controlled, the engine is stopped at a predetermined crank angle position.

Since the engine is stopped at the predetermined crank angle position by utilizing the controlled inertia energy, large energy is not needed to control the stop position of the energy, and the energy needed for the stop control can be reduced. Also, since the inertia energy utilized for the stop control is constantly controlled in a predetermined state, it is possible to stably stop the engine at the appropriate position each time.

The inertia energy control unit may control a number of engine revolution to be within a range of a predetermined number of engine revolution. The inertia energy of the engine is generally associated with the number of engine revolution, and the inertia energy of the engine can be controlled by controlling the number of engine revolution. Therefore, by controlling the number of engine revolution to be within a predetermined range, the inertia energy of the engine can be accurately controlled.

The inertia energy control unit may control the inertia energy by a motor for driving the engine. Therefore, by utilizing the motor installed in the vehicle, the inertia energy can be controlled. For example, a motor generator for applying the driving force to the rotational axis of the engine is provided on a so-called economic-running vehicle having an idling stop function or a hybrid vehicle. By using the motor generator, the inertia energy can be controlled.

The combustion control unit may start the combustion of the engine while driving by the motor is continued, when a starting request occurs in the engine in a condition that the number of engine revolution is controlled to be within the predetermined number of engine revolution by the motor. While the motor controls the number of the engine revolution during an automatic engine stop control for the purpose of the idling stop, if the request for starting the engine, e.g., the start command of the vehicle, is issued, the combustion of the engine can be restarted to start the engine with continuing the driving by the motor. Therefore, the engine can be quickly restarted when the start request is issued, even during the stop control.

The stop control unit may stop the engine at the predetermined crank angle position by adding control force to the engine by the motor for driving the engine. At the time of stopping the engine at the predetermined crank angle position by using the inertia energy, by adding the driving (assisting) force or braking force by the motor, if necessary, the accuracy of the stop position control can be improved.

The stop control unit may add the control force to the engine by the motor for driving the engine when the engine is not estimated to stop at the predetermined crank angle position. Thereby, when it is estimated that the engine cannot be stopped at the predetermined crank angle position by the inertia energy controlled to be the predetermined state, the engine can be controlled to stop at the predetermined crank angle position by adding the control force by the motor.

The control apparatus of the internal combustion engine may further include a detecting unit which detects a number of idling revolution of the engine, and the stop control unit may inhibit stopping the engine when the number of idling revolution is larger than a predetermined value. If the number of idling revolution is higher than a predetermine value at the time of stopping the engine, the load of the motor to control the inertia energy becomes larger and the control becomes unstable. Therefore, by inhibiting the engine stop, the failure of the stop control is avoided.

The control apparatus of the internal combustion engine may further include a detecting unit which detects the number of idling revolution, and the combustion control unit may increase the combustion of the engine to increase the number of engine revolution before stopping the combustion of the engine when the number of idling revolution is smaller than the predetermined value. If the number of idling revolution is lower than a predetermined value, appropriate inertia energy cannot be obtained and the stop control may fail. Therefore, the engine is stopped by the inertia energy after the number of revolution is increased by increasing the combustion.

The combustion control unit may stop the combustion of the engine when the inertia energy control unit controls the number of engine revolution to be within the predetermined number of engine revolution. When the number of engine revolution is controlled by the motor, if the combustion in the engine is continued, the number of revolution is varied due to the combustion and it becomes difficult for the motor to stably control the number of revolution. Therefore, it is preferred to control the inertia energy in such a state that the combustion in the engine is stopped.

The control apparatus of the internal combustion engine may further include a unit for reducing loads of the engine when the stop control unit performs an engine stop control. When the stop control of the engine is performed, if there is a load, e.g., the air conditioner, on the engine, the energy necessary to control the revolution number of the engine becomes large, and the control may be unstable due to the variation of the load. Therefore, it is preferred that the stop control is performed with reducing the load on the engine as small as possible.

The control apparatus of an internal combustion engine may further include: a start control unit which drives the engine by the motor at a time of engine start; an estimation unit which estimates a cylinder in a compression stroke and/or an expansion stroke at the time of the engine stop; a detection unit which detects the cylinder; a supplying unit which supplies fuel to the cylinder; and a combustion unit which combusts the fuel supplied to the cylinder at the time of the engine start.

In this control apparatus, the engine can be stopped at a predetermined crank angle position at the time of the engine stop. Therefore, the engine can be stopped at the crank angle position at which starting the engine is easy.

Furthermore, the control apparatus can estimate the cylinders in the compression stroke and/or an expansion stroke at the time of the engine stop, and detect the cylinders. Thus, based on the detected result, at an optimal timing during executing the stop control, fuel can be supplied into the cylinder. At this time, since the mixture introduced into the cylinder is well atomized and homogenized by receiving heat energy from the cylinder, the mixture is easy to ignite.

Therefore, at the time of the engine start, by igniting the fuel introduced in the compression stroke cylinder and/or the expansion stroke cylinder by an igniter, the fuel can be ignited and the engine can be started. Thereby, the time until the first explosion can be shortened, and prompt engine start can be achieved. Since the engine driving by the motor, i.e., cranking, is executed at the same time, it becomes easy to get over the first and second compression stroke top dead centers to reliably execute the engine start.

If a vehicle is so-called "economic-running" vehicle to which idling stop technique is applied, hybrid vehicles and the like, a waiting time for the engine start can be shortened. In this case, the vehicle is capable of promptly starting the engine because the cranking is executed by the motor (e.g., a motor generator and the like) while the ignition is performed to the cylinder when requested to start the engine after the idling stop.

If the cranking by the motor is executed after the engine starts revolution by the ignition start, the torque needed for the motor at the time of the engine start can be small. Thus, the energizing time to the motor can be shortened, and a power consumption of a power supply unit (battery and the like) can be reduced.

In an example, the supplying unit supplies the fuel to the cylinder via an intake port, or directly supplies the fuel to the cylinder.

According to this example, when the supplying unit executes fuel supply via the intake port, immediately before the engine stop control, the fuel can be supplied into the cylinder via the fuel injection apparatus when the cylinder is in the intake stroke. On the other hand, when the supplying unit supplies the fuel directly into the cylinder, the fuel can be supplied into the cylinder via the fuel injection apparatus at any one of the timings, i.e., during executing the engine stop control, at the time of the engine stop, and at the time of the engine start.

The predetermined crank angle position may be a stop position at which a torque of the motor needed at the time of the engine start becomes small.

In this case, the engine can be stopped at the crank angle position at which the torque of the motor needed at the engine start is small. The predetermined crank angle may be 90° CA to 120° CA, for example.

The engine may stop at the predetermined crank angle position by the motor which controls a number of engine revolution to be within a predetermined number of engine revolution.

In this case, by transmitting the revolution driving force from the motor to the engine when the engine is in the predetermined number of engine revolution, the number of engine revolution can be controlled to be within the predetermined number of engine revolution. Thereby, the engine can be stopped at the predetermined crank angle position by keeping the inertia energy included in the engine constant afterward.

The supplying unit may supply the fuel to the cylinder when the cylinder which is detected based on the detection unit immediately before the time of the engine stop is in the intake stroke.

At the time of the engine stop, the cylinder can be estimated and detected, and immediately before the engine stop control, the fuel can be supplied into the cylinder via the fuel injection apparatus connected to the intake port when the cylinder becomes in the intake stroke.

The start control unit may start the engine by driving the motor when a current value added to the motor is larger than a predetermined value at the time of the engine start.

When a current value supplied to the motor is out of a predetermined range, it is highly possible that the torque of the motor needed at the time of the engine start is not enough. Therefore, if the driving of the motor is executed for the engine start at this time, the motor may be locked. To the contrary, when the current value supplied to the motor is within the predetermined range, the torque of the motor needed for the engine start is kept enough. Thus, by driving the motor at this time, the lock of the motor can be prevented, and the cranking by the motor can be reliably executed. Therefore, the engine start can be promptly and reliably executed if the cranking by the motor is executed when the motor can be supplied with sufficient exciting current, in addition to the ignition start to the expansion stroke cylinder and/or the compression stroke cylinder, at the time of the engine start.

In a preferred example, the estimation unit may estimate the cylinder which is in the compression stroke and/or the expansion stroke, based on the number of engine revolution at a time of stopping driving by the motor. In another preferred example, the estimation unit may estimate the cylinder which is in the compression stroke and/or the expansion stroke, based on the number of engine revolution at the time of stopping driving by the motor and a kind of the stroke of each cylinder at a time of starting driving by the motor. In that case, the estimation unit may specify the kind of the stroke of each cylinder, based on a cam position of the cylinder.

The nature, utility, and further features of this invention will be more clearly apparent from the following detailed description with respect to preferred embodiment of the invention when read in conjunction with the accompanying drawings briefly described below.

BEST MODE FOR CARRYING OUT THE INVENTION

Preferred embodiments of the present invention will be explained below with reference to the attached drawings.

[Configuration of Vehicle]

First, the description will be given of a schematic configuration of a vehicle to which a control apparatus of an internal combustion engine according to the present invention is applied. A control apparatus of the internal combustion engine according to the present invention is intended for so-called "economic-running" vehicles, hybrid vehicles and the like to which idling stop technique is applied. "An economic-running vehicle" is a vehicle which is equipped with an electric motor (motor generator) mainly for the purpose of starting the engine and which automatically restarts the engine by the motor generator after stopping the engine by the idling stop control. "A hybrid vehicle" is a power train using an engine and a motor generator as power sources. In a hybrid vehicle, both the engine and the motor generator work in combination in accordance with a running state, or are separately used, and power performance which is smooth and excellent in response can be obtained.

Figure 1:
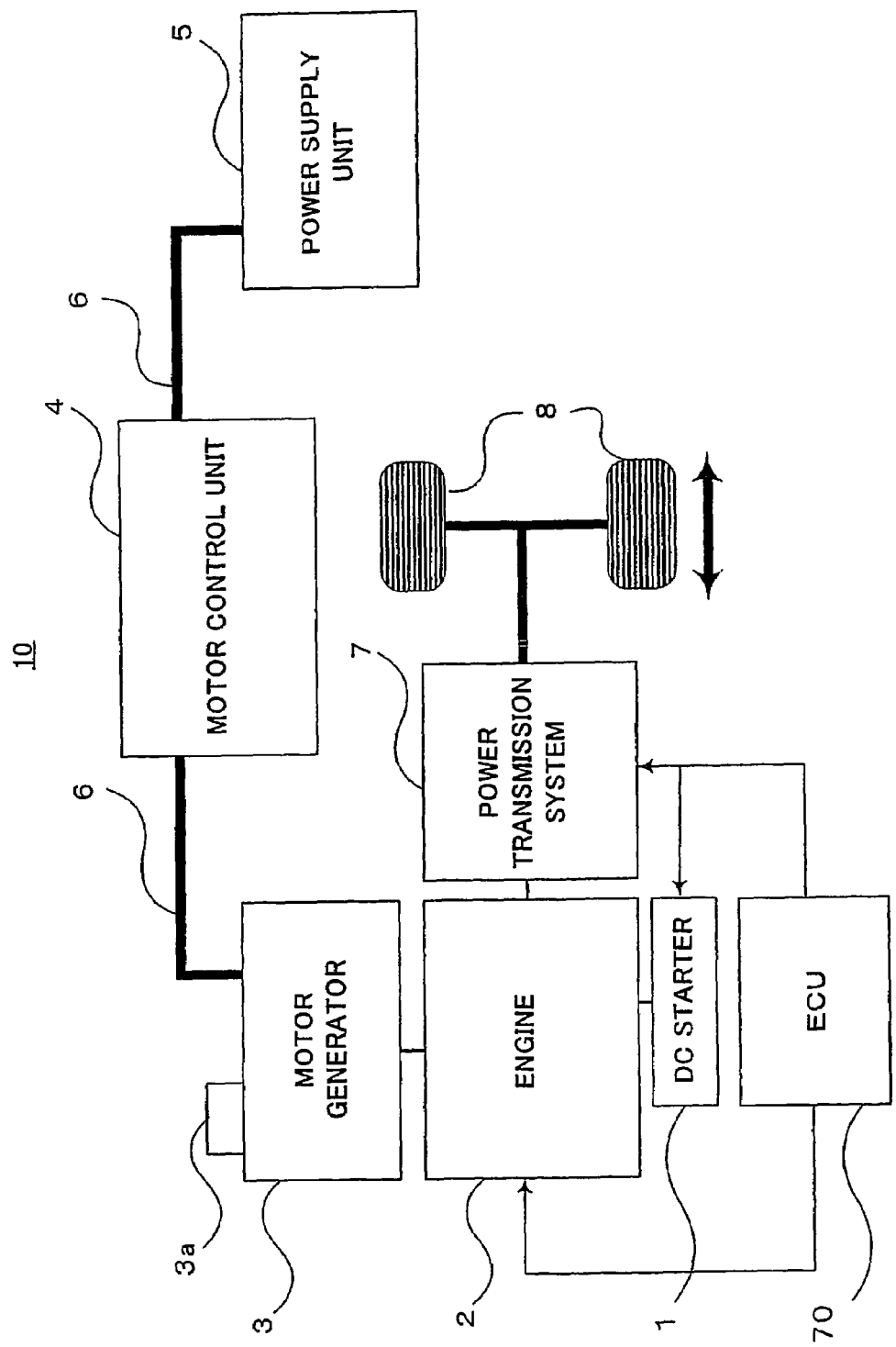
FIG. 1 shows a system configuration of a vehicle, which performs an engine stop control according to the present invention.

FIG. 1 shows a system configuration of a vehicle 10 according to the present invention.

As shown in FIG. 1, the vehicle 10 includes a DC starter 1, an engine 2, a motor generator 3 which generates electricity by a driving force outputted from the engine 2 and is drivable as a cell motor on the occasion of starting the engine 2, a motor control unit 4 to control the motor generator 3 and the like, a power supply unit 5 for exchanging electric power with the motor generator 3 and the like via the motor control unit 4, a power supply cable 6 for connecting the motor generator 3, the motor control unit 4 and the power supply unit 5, respectively, a power transmission system 7 for transmitting a driving force generated from the engine 2 to wheels, and the wheels 8.

Next, each of the above-described units will be explained with reference to FIG. 1.

The DC starter 1 is a dc-type cell motor for starting the engine 2. The DC starter 1 has a shaft, receives a power supply from a 12V power supply unit when an ignition switch is turned to an ON state, and rotates the shaft. By the rotation of the shaft of the DC starter 1, a crankshaft of the engine 2 is rotated and the engine 2 is started. Specifically, a pinion gear is mounted on a tip end portion of the shaft of the DC starter 1. The pinion gear is meshed with a ring gear of a flywheel provided at the crankshaft of the engine 2. Consequently, when the DC starter 1 receives a power supply from the 12V power supply unit by the start of the engine 2, the pinion gear is meshed with the ring gear of the flywheel and rotated to rotate the flywheel. As a result, the crankshaft with a predetermined number of pistons being connected is rotated, and therefore the engine 2 can be started by the rotational driving force. Driving the crankshaft to start the engine is called "cranking".

The engine 2 is the internal combustion engine for generating power by exploding air-fuel mixtures (herein after simply referred to as "mixture") in cylinders. There are gasoline engines with gasoline as a fuel, diesel engines with light oil and the like as a fuel, and the like as the internal combustion engines. As the gasoline engines, there are four-cycle gasoline engines which complete one cycle of intake, compression, expansion and exhaust during two rotations of crankshaft to generate power, and two-cycle gasoline engines which complete the aforementioned one cycle during one rotation of crankshaft. The vehicle 10 in this embodiment is assumed to be the four-cycle gasoline engine.

Figure 2:
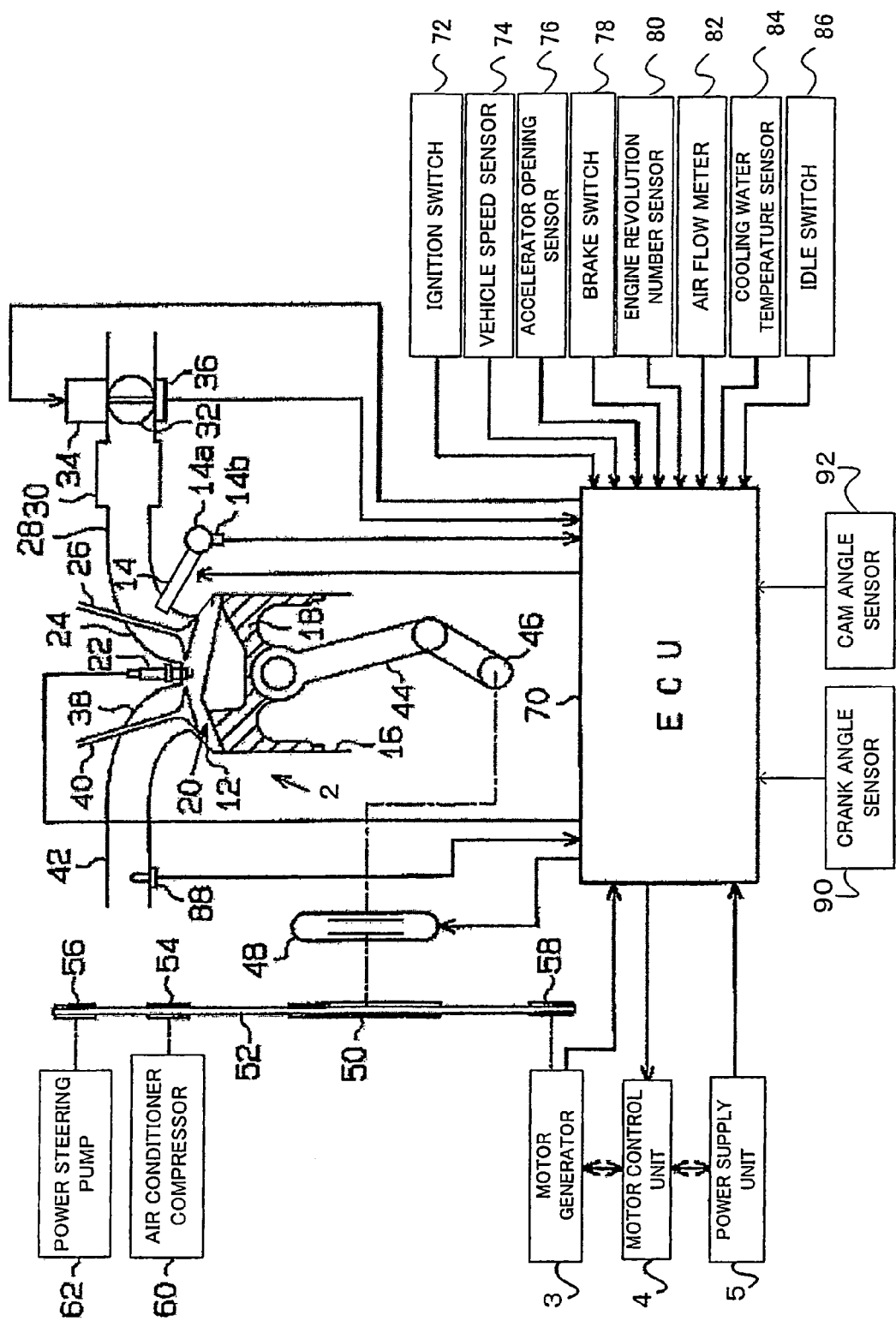
FIG. 2 shows a schematic block diagram of an engine according to the present invention.

FIG. 2 shows one example of a schematic configuration of the engine 2.

An intake port 24 formed at a cylinder head 12 is opened and closed by an intake valve 26. Intake air is supplied into the intake port 24 via an intake passage 28. The intake passage 28 is provided with a surge tank 30, and a throttle valve 32 is provided at an upstream of the surge tank 30. An opening (throttle opening TA) of the throttle valve 32 is adjusted by an electric motor 34, and the throttle opening TA is detected by a throttle opening sensor 36.

The engine 2 is a so-called port-injection type engine, and the intake port 24 is provided with a fuel injection valve 14. An air-fuel mixture is generated by the intake air inside the intake port 24 and the fuel injected into the intake port 24, and is introduced into the combustion-chamber 20 partitioned by the cylinder block 16, the piston 18 and the cylinder head 12. The ignition plug 22 is disposed at a ceiling portion of the combustion chamber 20, and ignites the mixture introduced from the intake port 24. High pressure fuel is supplied to the fuel injection valve 14 from a high pressure fuel pump (not shown) via a delivery pipe 14a. This enables the injection of fuel into the combustion chamber 20 from the fuel injection valve 14 even in the last period of the compression stroke. Fuel pressure in the delivery pipe 14a is detected by the fuel pressure sensor 14b.

The exhaust port 38 formed at the cylinder head 12 is opened and closed by the exhaust valve 40. Exhaust gas discharged to the exhaust port 38 from the combustion chamber 20 is discharged to the outside via the exhaust passage 42, an exhaust gas purifying catalyst (not shown) and the like.

Reciprocal movement of the piston 18 generated by the combustion of the mixture inside the combustion chamber 20 is converted into rotational movement of the crankshaft 46 via the connecting rod 44. The crankshaft 46 transmits power to the wheels 8 via a torque converter and a transmission not shown.

Apart from such a power transmission system, one end of the crankshaft 46 is connected to the pulley 50 (hereinafter, also called "crankshaft pulley") via the electromagnetic clutch 48. The pulley 50 is capable of transmitting power to and from other three pulleys 54, 56 and 58 by the belt 52. In this example, the compressor 60 for an air conditioner is made drivable by the pulley 54, and the power steering pump 62 is made drivable by the pulley 56. The other pulley 58 (hereinafter, also called "MG pulley") is connected to the motor generator 3. The motor generator 3 has a function as a generator for generating power by the engine driving force from the side of the MG pulley 58, and a function as a motor for supplying the driving force of the motor generator 3 to the side of the MG pulley 58.

An ECU 70 (Engine Control Unit) mainly constructed with a microcomputer includes an input-output device, a storage device, a central processing unit and the like, and supervises and controls the whole system of the vehicle 10. The ECU 70 controls the vehicle 10 to be in an optimal condition based on input information from each sensor and the like provided on the engine 2. Specifically, the ECU 70 detects the fuel pressure from the aforementioned fuel pressure sensor 14b, the throttle opening TA from the throttle opening sensor 36, a revolving number of motor generator from a rotational frequency sensor included in the motor generator 3, the voltage of the power supply unit 5 or the current amount of the power supply unit 5 at the time of charge and discharge, a switching state of the ignition switch 72, a vehicle speed SPD from the vehicle speed sensor 74, a stamping or depressing amount on an accelerator pedal (accelerator opening ACCP) from the accelerator opening sensor 76, presence or absence of stamping on a brake pedal from the brake switch 78, a number of revolution of the crankshaft 46 (i.e., number of engine revolution NE) from an engine revolution number sensor 80, an intake air amount GA from the air flow meter 82, the engine cooling water temperature THW from the cooling water temperature sensor 84, presence or absence of stamping on the accelerator pedal from the idle switch 86, an air fuel ratio detection value Vox from the air fuel ratio sensor 88 provided in the exhaust passage 42, a rotation position of a camshaft from the cam angle sensor 92, and a rotation angle (crank angle) of the crankshaft from the crank angle sensor 90, respectively.

Based on the data thus obtained, the ECU 70 drives the electric motor 34 to adjust the throttle opening TA, and adjusts the injection timing of the fuel by the fuel injection valve 14. Further, when an automatic stop condition is established, the ECU 70 controls the fuel injection from the fuel injection valve 14 to automatically stop the operation of the engine 2. When an automatic start condition is established, the ECU 70 controls the rotation the crankshaft 46 by the driving force of the motor generator 3 transferred via the pulley 58, the belt 52, the pulley 50 and the electromagnetic clutch 48 to start the engine 2. Further, the ECU 70 executes an ignition timing control, and the other necessary controls.

The output signal of the crank angle sensor 90 is inputted to the ECU 70. The crank angle sensor 90 is a magnetic type sensor or the like capable of detecting an object to be detected (for example, metal and the like), and is provided at a predetermined position near the crankshaft 46 in the engine 2. Namely, a gear with projections and depressions being formed on an outer circumference (hereinafter, called "signal rotor") is attached at a predetermined position on the crankshaft 46, and the crank angle sensor 90 is provided at an appropriate position to detect the number of teeth of the signal rotor. The crank angle sensor 90 can detect the rotation angle of the crankshaft 46 (hereinafter, called "crank angle") with resolution of, for example, about 10° to 30° CA. When the crankshaft 46 is rotated, the signal rotor also rotates in synchronization with the crankshaft 46. In this situation, the crank angle sensor 90 detects the number of teeth of the signal rotor and outputs it to the ECU 70 and the like as a pulse signal. The ECU 70 counts the pulse signal outputted from the crank angle sensor 90, and converts it into a crank angle. Thus, the ECU 70 and the like detect the crank angle. The crank angle sensor 90 is directly provided in the engine 2, and therefore it can detect the crank angle as an absolute angle.

The crank angle sensor 90 outputs one pulse signal to the ECU 70 and the like when it detects one of teeth of the signal rotor. Consequently, the pulse signal outputted from the crank angle sensor 90 is in the same output state irrespective of whether the crankshaft 46 is rotated in a normal direction or a reverse direction, and therefore the ECU 70 and the like cannot detect whether the rotation of the crankshaft 46 is in the normal direction or in the reverse direction.

The motor generator 3 is connected to the crankshaft 46 through the pulley 50, the pulley 58 and the belt 52. One of the crankshaft pulley 50 connected to the crankshaft 46 and the MG pulley 58 connected to the motor generator 3 is rotationally driven, whereby power is transmitted to the other via the belt 52.

The motor generator 3 has the function as the motor (electric motor) rotationally driving by receiving power supply from the power supply unit 5 which will be described later, and has the function as the generator (electric generator) for generating electromotive forces at both ends of a three-phase coil when the motor generator 3 is rotated by receiving the rotational driving force from the wheels 8. When the motor generator 3 functions as the electric motor, the motor generator 3 rotates by receiving the electric power supply from the power supply unit 5, and transmits the rotational driving force to the crankshaft pulley 50 to rotate the crankshaft 46 to start the engine 2. On the other hand, when the motor generator 3 functions as the electric generator, the rotational driving force from the wheels 8 is transmitted to the MG pulley 58 at the side of the motor generator via the crankshaft 46 and the crankshaft pulley 50 to rotate the motor generator 3. When the motor generator 3 is rotated, an electromotive force is generated in the motor generator 3, and the electromotive force is converted into a direct current via the motor control unit 4 to supply electric power to the power supply unit 5. Thus, the power supply unit 5 is charged.

Returning to FIG. 1, a motor angle sensor 3a, in which a Hall element or the like is preferably applied to a detection portion, is provided at a predetermined position in the motor generator 3. The motor angle sensor 3a can detect the rotation angle of the shaft of the motor generator 3 with high resolution of substantially 7.5° CA unit. When the motor generator 3 is rotationally driven by receiving the supply of electric power from the power supply unit 5, the motor angle sensor 3a detects the rotation angle of the shaft. Specifically, the motor angle sensor 3a is provided at each of phases U, V and W so as to be able to detect an alternating current of each of the U, V and W phases. Each of the motor angle sensors 3a detects an alternating current of each of the U, V and W phases and converts it into a pulse signal, and outputs it to the motor control unit 4.

The motor control unit 4 is provided in the engine 2, and connected to the motor generator 3 and the power supply unit 5 by the power supply cable 6, respectively. The motor control unit 4 is mainly constructed by an inverter, a converter, a controlling computer or the like.

The inverter converts a high voltage direct current from the power supply unit 5 into a predetermined three-phase alternating current to supply electric power to the motor generator 3. On the other hand, the inverter converts an electromotive force (three-phase alternating current) generated from the motor generator 3 into a direct current suitable for charging the power supply unit 5.

The converter is a DC/DC converting device for converting a predetermined DC voltage into another predetermined DC voltage. Namely, the converter drops the rated voltage (for example, 36 V voltage) of the power supply unit 5 to a predetermined voltage (for example, 12V voltage) to drive auxiliary machines and the like, or charges a 12V power supply unit loaded on the vehicle.

The controlling computer controls the inverter and the converter. Namely, the controlling computer controls the driving torque and power generation amount of the motor generator 3 in the optimal state, and controls the charge amount to the power supply unit 5 in the optimal state to perform charging. Specifically, when the motor generator 3 functions as the electric motor, the controlling computer controls the driving torque and the power generation amount of the motor generator 3 based on the electric power supplied from the power supply unit 5. As a result, the motor generator 3 is controlled in the optimal state to function as the electric motor. On the other hand, when the motor generator 3 functions as the electric generator, the controlling computer supplies a predetermined direct current to the power supply unit 5 based on the electromotive force generated from the motor generator 3 to charge the power supply unit 5.

The motor control unit 4 counts the number of pulse signals outputted from the aforementioned motor angle sensor 3a, and thereby converts the number into the rotation angle of the shaft of the motor generator 3. The motor control unit 4 converts the converted rotation angle of the shaft into the crank angle based on the rotation ratio of the crankshaft pulley 50 and the MG pulley 58. As a result, the motor control unit 4 can detect the crank angle with high resolution of substantially 3° CA unit.

The motor control unit 4 can detect whether the shaft of the motor generator 3 rotates in the normal or in the reverse direction. Namely, the output state of the pulse signal of each of the phases U, V and W differs when the shaft of the motor generator 3 rotates in the normal direction and in the reverse direction. The pulse signal of each of the phases U, V and W when the shaft of the motor generator 3 rotates in the normal direction is in such an output state according to the phase difference as the pulse signal of the U phase is firstly outputted for a predetermined time, thereafter, the pulse signal of the V phase is outputted for a predetermined time later, thereafter, the pulse signal of the W phase is outputted for a predetermined time later, and they are repeated periodically. In contrast, the pulse signal of each of the phases U, V and W when the shaft of the motor generator 3 rotates in the reverse direction is in such an output state as the pulse signal opposite to that of the normal rotation. Namely, when the shaft of the motor generator 3 rotates in the reverse direction, each of the pulse signals for the predetermined time is periodically repeated in the order of the W phase, V phase and U phase. For this reason, the motor control unit 4 can detect whether the shaft of the motor generator 3 rotates in the normal or the reverse direction, based on the phase difference between them.

The power supply unit 5 is a secondary battery such as a lead battery or a nickel hydrogen battery. The power supply unit 5 is placed at, for example, a rear part of the vehicle 10 to increase space efficiency of the vehicle 10. The power supply unit 5 may have a rated voltage of 36V, for example. The power supply unit 5 has high input-output characteristics at the time of actuation of the motor generator 3 or in energy regeneration during braking the vehicle. Specifically, the power supply unit 5 supplies electric power to the auxiliary machines, the motor generator 3 and the like. Electric power supply to the motor generator 3 is mainly performed while the vehicle 10 is stopped. When the vehicle 10 is running or braking, the electromotive force generated from the motor generator 3 is converted into a direct current via the motor control unit 4 and supplied to the power supply unit 5. As a result, the power supply unit 5 can be charged.

The power supply cable 6 is connected between the motor generator 3 and the motor control unit 4, and also between the motor control unit 4 and the power supply unit 5 as described above, and plays the part of passing the direct current and the three-phase alternating current.

The power transmission system 7 is mainly constructed by the torque converter, a lock-up clutch, a transmission, a power switching mechanism and the like. As a result of their cooperation, the power transmission system 7 transmits or shuts off the rotational driving force generated from the engine 2 or the motor generator 3 to or from the wheels 8 in accordance with the running state. Also, the power transmission system 7 transmits the rotational driving force from the wheels 8 to the motor generator 3 at the time of braking and the like.

The wheel 8 includes tires and the like for transmitting the rotational driving force from the power transmission system 7 to a road surface. In this embodiment, rear wheels are shown as the wheels 8.

Next, examples of the crank angle sensor 90 and the cam angle sensor 92 will be explained.

Figure 3:
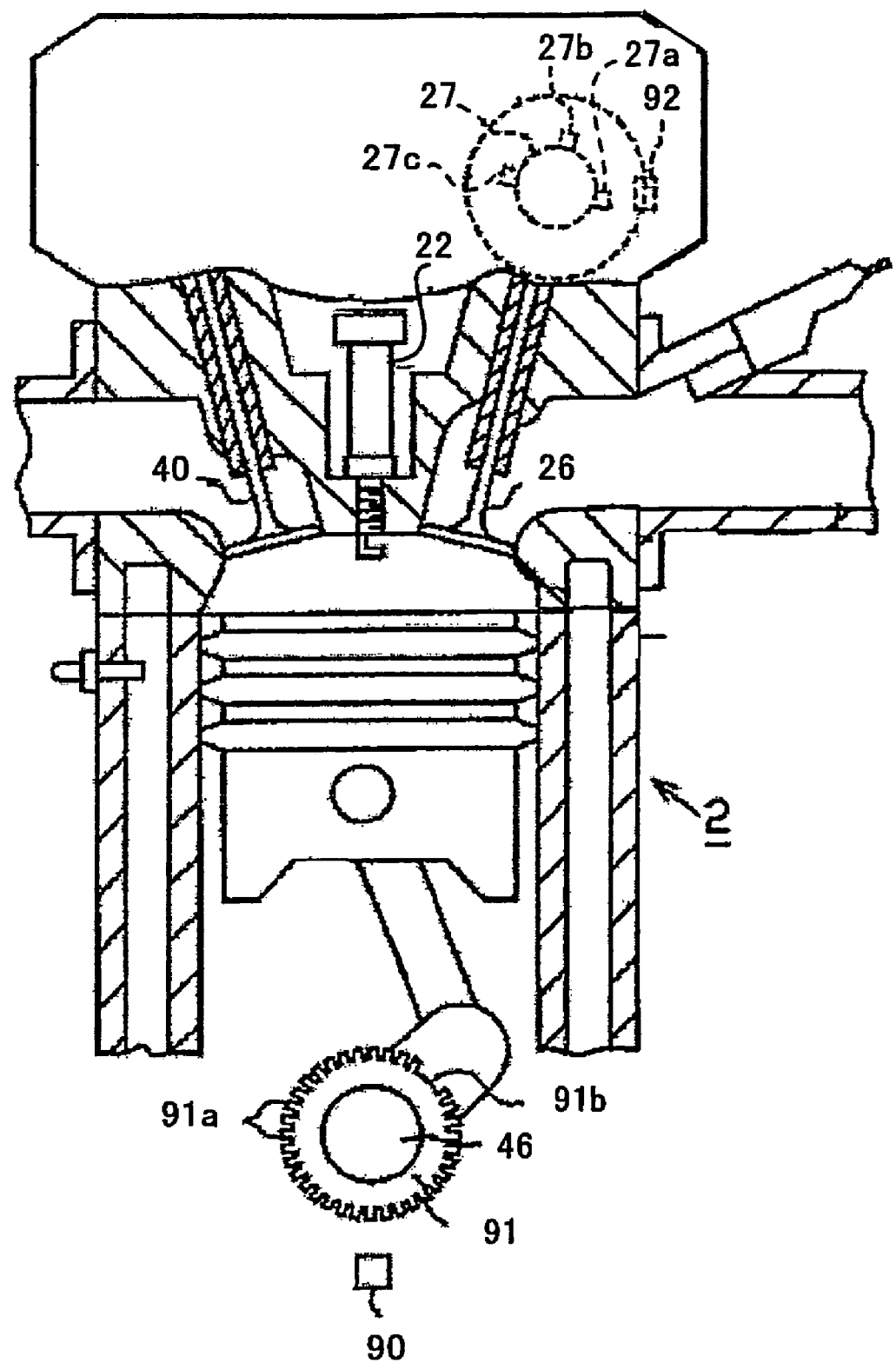
FIG. 3 is a view showing a configuration of a crank angle sensor and a cam angle sensor.

As shown in FIG. 3, a signal rotor 91 (omitted in FIG. 2) is attached to the crank shaft 46. On the outer circumferential portion of the signal rotor 91, 34 teeth (projection portions) 91a formed at equal angles (here, spaced by 10°) with an axis of the crankshaft 46 as a center and a wide lacked tooth (portion with no teeth existing) 91b are provided. The length of the lacked tooth portion 91b corresponds to that of two teeth 91a. The crank angle sensor 90 is provided to oppose the outer circumferential portion of the signal rotor 91. When the crankshaft 46 is rotated, the teeth 91a and the lacked tooth 91b of the signal rotor 91 pass near the crank angle sensor 90 in sequence, whereby a rotation signal of pulse form (hereinafter, called "NE signal") including pulses corresponding to the number of passages of the teeth 91a and the lacked tooth 91b is outputted from the crank angle sensor 90.

On the other hand, three projections 27a, 27b and 27c are provided on the outer circumferential surface of the intake camshaft 27 to be arranged at spaces of 90° (corresponding to 180° CA) with an axis of the intake camshaft 27 as a center. Accordingly, a space between the projection 27a and the projection 27c at both ends is 180° (corresponding to 360° CA). The cam angle sensor 92 for detecting the projections 27a to 27c and outputting the detection signals is provided to oppose these projections 27a to 27c. When the intake camshaft 27 is rotated, the projections 27a to 27c pass near the cam angle sensor 92. As a result, a detection signal in a pulse form is outputted from the cam angle sensor 92 corresponding to each passage of the projections 27a to 27c.

Figure 4A:
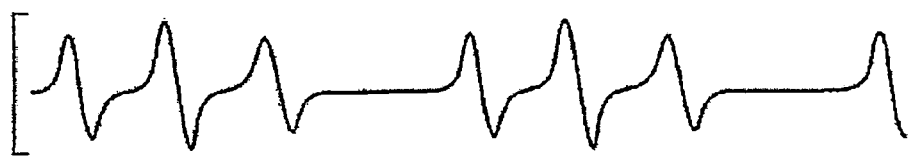
FIGS. 4A to 4D show output signal waveforms of the crank angle sensor and the cam angle sensor.
Figure 4B:
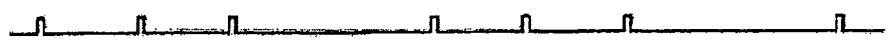
Figure 4C:
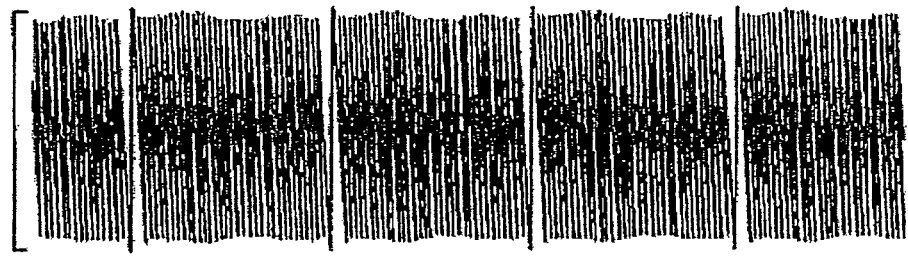
Figure 4D:

Here, the signals obtained from the crank angle sensor 90 and the cam angle sensor 92, which are inputted into the ECU 70 when the engine 2 is driven, are shown in FIGS. 4A, 4B, 4C and 4D. FIG. 4A shows a voltage waveform generated in the cam angle sensor 92 according to the rotation of the intake camshaft 27. FIG. 4B is the waveform obtained by converting the voltage waveform of FIG. 4A into the cam angle signal (G2 signal) in the pulse form. FIG. 4C shows a voltage waveform generated in the crank angle sensor 90 according to the rotation of the crankshaft 46. FIG. 4D is the voltage waveform obtained by converting the waveform of FIG. 4C into the NE signal. In this example, in the NE signal, the number of pulses corresponding to the teeth 91a is 34 per one rotation (360° CA) of the crankshaft 46. Among the rotation signals outputted from the crank angle sensor 90, in the portion corresponding to the lacked tooth 91b, the space between the pulses is made wide due to the absence of 2 pulses. The number of the portions with the wide pulse space is one per one rotation (360° CA) of the crankshaft 46.

The ECU 70 detects rotation phases of the crankshaft 46 and the intake camshaft 27 based on the NE signal from the crank angle sensor 90 and the cam angle signal from the cam angle sensor 92. The ECU 70 performs cylinder discrimination for each cylinder (#1 to #4) based on the rotation phases of the crankshaft 46 and the intake camshaft 27, and selects the cylinder for which the fuel injection and the ignition should be performed from among the cylinders (#1 to #4).

[Operation of Vehicle]

Next, an operation of the vehicle 10 constituted as described above will be explained. The vehicle 10 performs various kinds of operations in accordance with various operation states such as stop, start, normal running, accelerative running, braking or the like.

The engine 2 is in a stopped state during automatic stop (idling stop) of the vehicle 10. When driving of auxiliary machines such as an air compressor, a water pump, a power steering pump or the like is necessary in this state, the motor generator 3 receives the electric power supply from the power supply unit 5 and drives these auxiliary machines without driving the engine 2. However, the engine 2 and the motor generator 3 are rotatably connected with each other via the V belt and the respective pulleys. Therefore, when the shaft of the motor generator 3 is rotated, the rotational driving force is transmitted to the engine 2 in this state. Consequently, in order to drive only the above-described auxiliary machines, the electromagnetic clutch is operated to shut off the rotational driving force from the motor generator 3 so that the crankshaft of the engine 2 is not rotated. This enables to drive only the auxiliary machines without driving the engine 2.

At the time of starting the vehicle 10, namely, when a driver takes his or her foot off the brake pedal while the vehicle is in the idling stop state, the motor generator 3 raises the number of revolution to the vicinity of the number of idling revolution. Then, when the driver stamps or depresses the accelerator pedal, the motor generator 3 rotates the crankshaft of the engine 2 and automatically restarts the engine 2. When a predetermined time elapses from the brake off operation, namely, from the time when the driver takes his or her foot off the brake pedal, the engine 2 may also be automatically restarted to obtain optimal power performance.

At the time of normal running, the vehicle 10 runs by the driving force from the engine 2, which is transmitted to the wheels 8 as in the ordinary vehicles. During normal traveling, if the voltage of the power supply unit 5 is low, the driving force from the wheels 8 is transmitted to the motor generator 3 and the motor generator 3 performs electric power generation. As a result, the motor generator 3 functions as an electric generator, and charges the power supply unit 5 to replenish insufficient electric power of the power supply unit 5 (hereinafter, this operation state will be called "regeneration") Thereby, the power supply unit 5 is always kept in a proper charged state.

When the vehicle 10 performs uphill running and accelerative running, the motor generator 3 is driven by using the electric power of the power supply unit 5 in addition to the state during the aforementioned normal running, in order to provide proper power performance, and the rotational driving force by the motor generator 3 may be given to the rotational driving force of the engine 2 (hereinafter, this operation state will be called "assist"). This allows the vehicle 10 to obtain high power performance with effective use of the two power sources, i.e., the engine 2 and the motor generator 3.

At the time of braking in deceleration and the like, the driving force by the wheels 8 is transmitted to the motor generator 3 via the power transmission system 7 and the engine 2, and the regeneration is performed.

[Engine Control]

Next, an engine stop control of the vehicle 10 will be explained. As described above, the vehicle 10 performs idling stop, namely, automatically stops the engine 2 at the time the vehicle 10 stops. Thereafter, when the driver takes his or her foot off the brake pedal, the motor generator 3 raises its revolution close to the number of idling revolution of the engine 2. Then, when the driver stamps or depresses the accelerator pedal, the motor generator 3 is rotationally driven, and the rotational driving force automatically restarts the engine 2. In this situation, in order to smoothly start running the vehicle 10 at the time of automatic start of the engine 2, the crank angle is controlled to stop at the optimal crank angle stop position inside the engine 2 at the time of idling stop. In the following example, accurate stop control is performed by effectively utilizing inertia energy of the engine 2 at the time of stopping the vehicle.

1st Embodiment

A method for controlling the crank angle to the optimal crank angle stop position will be described hereinafter. The optimal crank angle stop position is assumed to be a stop position of the crank angle, which makes it easy to get over the top dead center of the compression stroke at the time of restarting the engine 2 in the cylinder at the compression stroke. For example, in the case of the four-cylinder engine as in this example, the crank angle stop position is optimal if it is within a range of the crank angle of 90° CA to 120° CA.

In summary, in the ordinary stop control method of the vehicle 10, the ECU 70 executes fuel cut to the engine 2 at a predetermined timing from the idling state, and automatically stops the engine 2 by the inertia energy which the engine 2 has thereafter. However, the inertia energy which the engine 2 has varies each time according to the number of engine revolution at the time of the fuel cut, and the crank angle stop position differs each time accordingly. For this reason, with the ordinary stop control method of the vehicle 10, it is difficult to control the crank angle to stop at the optimal crank angle stop position, and the next engine start load becomes large depending on the crank angle stop position when the vehicle actually stops. Consequently, in relation with the output torque which the motor generator 3 has, the crankshaft of the engine 2 cannot be rotated, and the probability of failure of automatic restart of the engine 2 becomes high.

Consequently, in this example, the number of engine revolution is kept constant at a predetermined timing after the fuel cut, whereby the inertia energy which the engine 2 has is made constant at that point of time. Thereafter, the inertia energy which the engine 2 has at that point of time is utilized to stop the rotation of the engine 2. By this, the crank angle can be reliably controlled to stop at the optimal crank angle stop position every time.

Especially, in this embodiment, the motor generator 3 is used to make the number of engine revolution constant.

Namely, a rotational driving force from the motor generator 3 is given to the crankshaft at a predetermined timing after the fuel cut (hereinafter, called "motoring"), whereby the inertia energy which the engine 2 has is made constant. Thus, the crank angle at the time of stopping the engine is controlled to stop at the optimal crank angle stop position. When the crank angle is at the optimal crank angle stop position, the engine start load at the time of starting the engine can be minimized, and the failure of automatic restart of the engine 2 can be effectively prevented.

Figure 5:
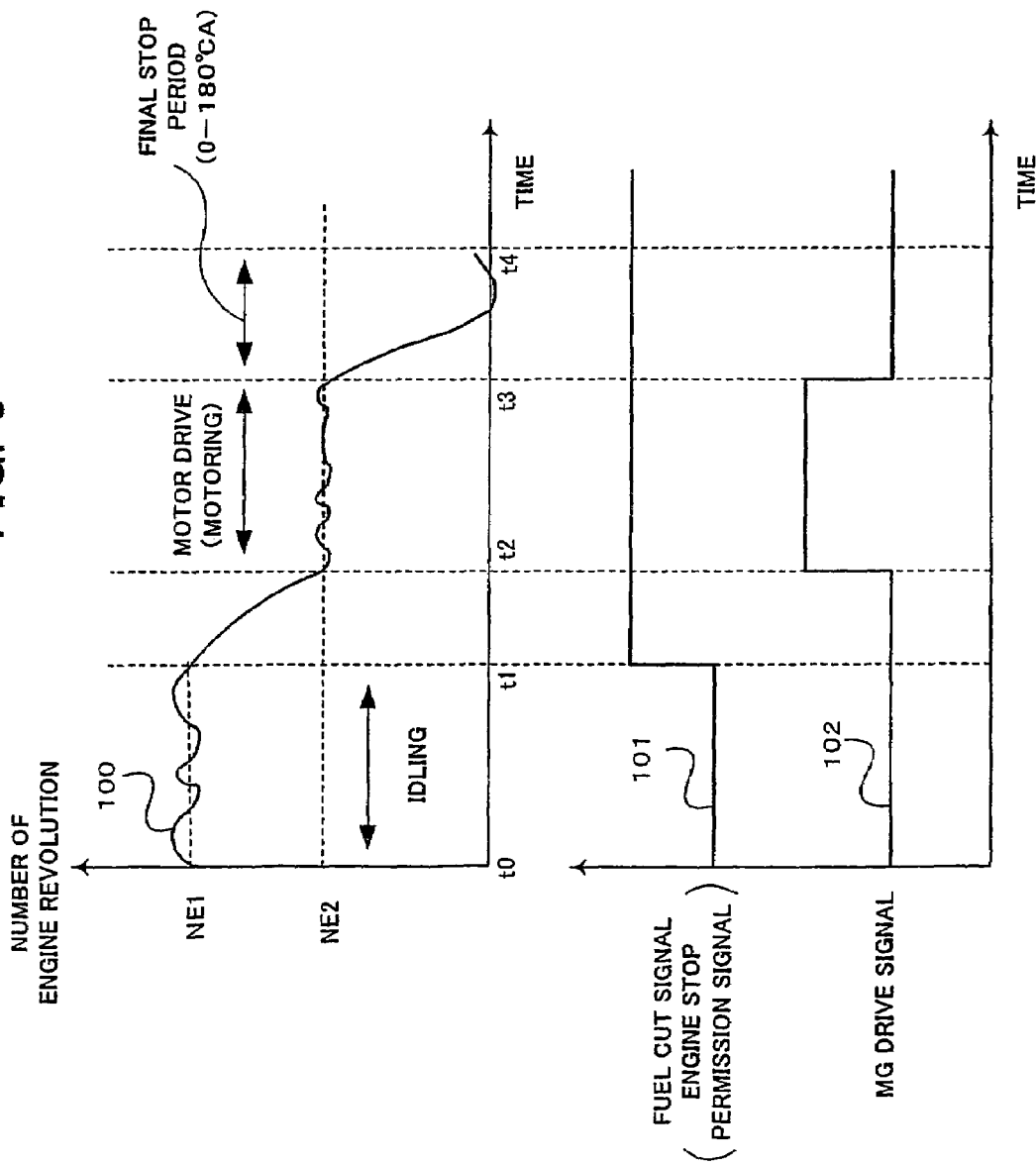
FIG. 5 is a graph showing a transition of a number of engine revolution during an engine stop control.

The manner of controlling the number of engine revolution at the time of stopping the engine with use of the motor generator 3 is shown in FIG. 5. In FIG. 5, the waveform 100 represents the variation of number of engine revolution according to the engine stop control of this embodiment. The waveform 101 represents a fuel cut signal in the engine stop control, and the fuel cut is executed when the fuel cut signal is at an H-level. The waveform 102 represents a drive signal (MG drive signal) of the motor generator 3, and the motor generator 3 is driven during the period in which the MG drive signal is at the H-level.

If it is assumed that the driver takes his or her foot off the accelerator pedal at time to, the number of revolution of the engine 2 after time to substantially becomes the number of idling revolution NE1. If it is assumed that the driver depresses the brake pedal at time t1, the ECU 70 sets the fuel cut signal to H-level at this point of time, and gives an instruction of the fuel cut. When the fuel cut is executed at time t1, the number of revolution of the engine 2 gradually decreases. When the ECU 70 detects that the number of engine revolution decreases down to a predetermined motor setting number of revolution NE2 (time t2), the ECU 70 sets the MG driving signal to the H-level, drives the motor generator 3, and drives the engine 2 by the motor generator 3.

The motor generator 3 drives the engine 2 at the predetermined motor setting number of revolution NE2 for a predetermined period (time t2 to t3), and when the predetermined period elapses, the ECU 70 stops the motor generator 3 (time t3). When the driving force by the motor generator 3 is removed at time t3, the engine 2 is rotated only by the inertia energy which the engine 2 has at that point of time (i.e., time t3), and therefore the number of engine revolution gradually decreases, and the engine 2 stops in the vicinity of time t4.

In this manner, in the present embodiment, the driving of the engine 2 is temporarily switched to the driving by the motor generator 3 at the time of stopping the engine, and after the engine 2 is kept at the predetermined number of revolution NE2, the driving force of the engine is removed. The inertia energy, which the engine 2 has at the point of time when the driving force is removed, is mainly determined by the number of engine revolution at that point of time. Therefore, by removing the driving force after the number of engine revolution is kept at the predetermined number of engine revolution NE2, the engine 2 has the same inertia energy each time, and stops in the same manner.

Figure 6:
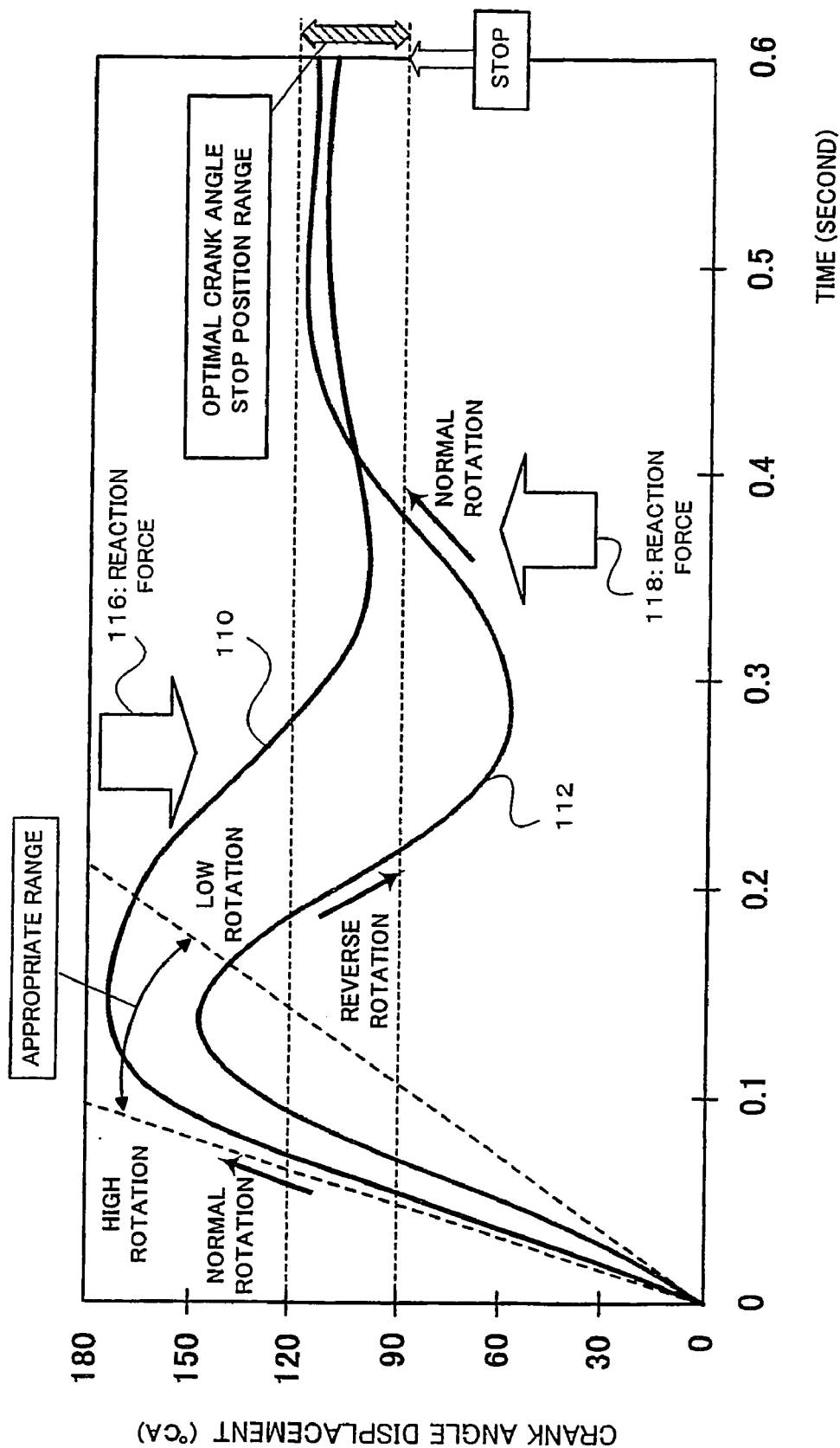
FIG. 6 is a graph showing a state of a change of a crank angle position during an engine stop control.

Next, a behavior of the engine until the engine stops after the driving force is removed at the predetermined number of engine revolution NE2 as described above will be explained. FIG. 6 shows the displacement of the crank angle of the engine 2 after the driving force for the engine 2 is removed. In FIG. 6, the vertical axis shows the displacement of the crank angle (° CA) of a predetermined cylinder. It is noted that the "predetermined cylinder" is the cylinder which is in the compression stroke when the crank angle is displaced from 0° CA to 180° CA, for example, the #3 cylinder. The horizontal axis shows time (second).

Specifically, the vertical axis shows the crank angle displacement (° CA) when the piston corresponding to the predetermined cylinder shifts from the compression stroke to the expansion stroke, and shows the crank angle displacement at every 30° CA from the bottom dead center (0° CA) to the top dead center (180° CA). Meanwhile, the horizontal axis shows the lapse of time (0.6 (second)) from the motoring stopping time (0 (second)) until the crank angle of the predetermined cylinder is controlled to stop at the optimal crank angle stop position at every 0.1 (second).

Next, the graphs in FIG. 6 will be explained. In FIG. 6, two kinds of graphs are shown. They are a graph 110 for the case in which the number of engine revolution at the time of stopping driving (motoring) by the motor generator 3 is high and a graph 112 for the case in which it is low. Namely, during the time from 0 second to 0.1 seconds, the graph 110 with a large gradient shows the crank angle displacement when the number of engine revolution at the time of stopping motoring is high, and the graph 112 with a small gradient shows the crank angle displacement when the number of engine revolution at the time of stopping motoring is low.

First, from 0 second to the vicinity of 0.1 second, it is shown that the piston corresponding to the predetermined cylinder rises from the bottom dead center to the top dead center in the compression stroke. The piston corresponding to the center of the compression stroke just after 0.1 second elapses. At this time, the crankshaft 46 of the engine 2 is rotating in the normal direction.

Thereafter, the piston corresponding to the predetermined cylinder cannot get over the top dead center (180° CA) of the compression stroke, and the crankshaft of the engine 2 is rotated in the reverse direction until it is near 0.3 second. This is for the following reason. As a result that the piston corresponding to the predetermined cylinder approaches the top dead center of the compression stroke, the volumetric capacity in the cylinder gradually becomes smaller, and the pressure becomes higher. In proportion to this, the compression reaction force 116 to push back the piston becomes larger in the cylinder. Accordingly, in the vicinity of the top dead center of the compression stroke, the compression reaction force is the largest in the cylinder, and therefore the inertia energy which the engine has at that point of time cannot beat the compression reaction force. Thus, the piston corresponding to the predetermined cylinder is pushed back to the side of the bottom dead center of the compression stroke. Thus, the piston corresponding to the predetermined cylinder cannot get over the top dead center of the compression stroke, and the crankshaft of the engine 2 is rotated in the reverse direction.

Thereafter, the piston corresponding to the predetermined cylinder moves to the bottom dead center of the compression stroke, and the crankshaft 46 of the engine 2 is rotated in reverse again in the vicinity of 0.3 second. Namely, the crankshaft of the engine 2 is rotated in the normal direction. This is for the following reason. Namely, at this time, the piston corresponding to the predetermined cylinder firstly descends to the bottom dead center of the compression stroke. In the compression stroke, the intake and exhaust valves are both in the closed state, and therefore the volumetric capacity inside the cylinder becomes gradually larger as the piton descends to the bottom dead center of the compression stroke. Consequently, negative pressure is formed inside the cylinder, and the negative pressure becomes gradually larger. Accordingly, the piston corresponding to the predetermined cylinder is returned in the direction of the top dead center again by a reaction force 118 caused by the negative pressure. As a result, the crankshaft of the engine 2 is rotated in the normal direction again.

Thereafter, the inertia energy which the engine 2 has gradually decreases from the vicinity of 0.3 second, and the engine 2 stops after 0.6 second elapses. As a result, the crank angle stop position converges within a range of the crank angle of 90° CA to 120° CA. If the crank angle stop position ultimately converges within the range of the crank angle of about 90° CA to 120° CA, it is considered that the crank angle is controlled to stop at the optimal crank angle stop position, and the stop control is successful.

As described above, the number of engine revolution at the time of stopping the motoring is preset, in advance, within a suitable range, in which the engine indicates the above-described behavior after stopping the motoring. An upper limit of the suitable range for the number of engine revolution is the number of engine revolution at which the predetermined cylinder of the engine cannot get over the next top dead center by the inertia energy of the engine 2 at that number of engine revolution. This is because the predetermined cylinder gets over the next top dead center after stopping the motoring when the number of engine revolution is higher than the suitable range at the time of stopping the motoring, and does not stop at the optimal crank angle stop position eventually, as shown in FIG. 6. On the other hand, a lower limit of the suitable range for the number of engine revolution is the number of engine revolution at which the crank angle, which is rotated in the reverse direction by the compression reaction force 116, can be turned over again to the normal direction due to a reaction force 118 by the negative pressure in the cylinder, in a case when the motoring is stopped at that number of engine revolution. If the number of engine revolution at the time of stopping the motoring is lower than the lower limit of the number of engine revolution, the engine which rotates in the reverse direction by the compression reaction force 116 cannot turn over again to the normal direction, and finally the engine cannot stop within the range of the optimal crank angle stop position.

As described above, it is understood that the crank angle stops at the optimal crank angle stop position by the inertia energy of the engine 2, if the number of engine revolution is within the suitable range (e.g., within the constant range of about 300 (rpm) to 500 (rpm)) when the motoring is ended. Thus, in the embodiment, the ECU 70 keeps the number of engine revolution constant each time by executing the motoring at the predetermined timing, after executing the fuel cut at the predetermined timing in the constant idling state (e.g., around 1400 (rpm)). Here, the execution time of the motoring is the time for keeping the inertia energy of the engine 2 constant after stopping the motoring, i.e., the time needed until the number of engine revolution by the motoring becomes stable at the predetermined number of engine revolution NE2. For example, the execution time may be the time in which the crankshaft of the engine 2 rotates twice.

After stopping the motoring, the constant inertia energy of the engine 2 is effectively utilized to stop the engine. Namely, the piston corresponding to the predetermined cylinder operated by the inertia energy of the engine 2 receives, first, the compression reaction force 116 occurring at the top dead center of the compression stroke, and second, the reaction force (the reaction force by the negative pressure) 118 occurring in the compression stroke. Thereby, the inertia energy of the engine 2 is effectively consumed, and the crank angle can be controlled to be the optimal crank angle stop position.

It is noted that the compression reaction force 116, which is received by approach of the piston corresponding to the predetermined cylinder to the top dead center of the compression stroke, becomes large, when the number of engine revolution after stopping the motoring is high within the suitable range, as understood from FIG. 6. However, the reaction force 118 in the cylinder in the compression stroke by the negative pressure becomes small. Thereby, by operating those normal and reverse reaction forces with each other, the inertia energy of the engine 2 can be effectively absorbed.

On the other hand, when the number of engine revolution after stopping the motoring is low within the suitable range, the compression rotation force 116, which is received by approach of the piston corresponding to the predetermined cylinder to the top dead center of the compression stroke, becomes small as understood from FIG. 6. However, the reaction force 118 which brings the piston to the side of the top dead center by the negative pressure becomes large. Thereby, by operating those normal and reverse reaction forces with each other, the inertia energy of the engine 2 can be effectively absorbed.

Namely, when the reaction force (compression reaction force) 116 which is received first is large, the reaction force (reaction force occurring by the negative pressure) 118 which is received next is small. On the other hand, when the reaction force (compression reaction force) 116 which is received first is small, the reaction force (reaction force occurring by the negative pressure) 118 which is received next is large. According to the embodiment, if the number of engine revolution after stopping the motoring is within the suitable range (even though the number is high or low in the range), the inertia energy of the engine 2 is cancelled with each other by operating the compression reaction force and the reaction force occurring by the negative pressure with each other. Therefore, the crank angle can be promptly and reliably controlled to the optimal crank angle stop position. When the crank angle can be controlled to the optimal crank angle stop position, the motor generator 3 can execute the automatic restart of the engine 2 by the minimum outputting torque (starting load). Thereby, the starting performance of the engine 2 can be improved.

Figure 7:
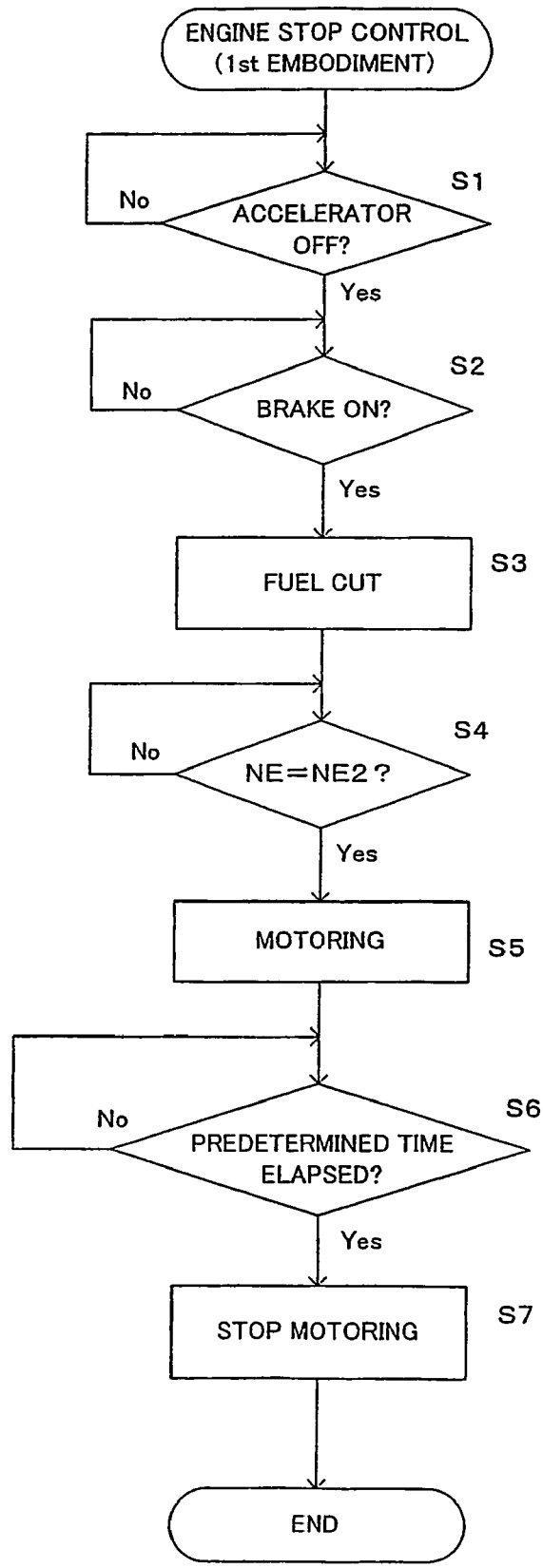
FIG. 7 shows a flow chart of an engine stop control according to a first embodiment.

Next, a flow of the engine stop control according to this embodiment will be explained with reference to FIG. 7. FIG. 7 is a flow chart of the engine stop control according to the first embodiment. It is noted that the engine stop control described hereafter is executed by the ECU 70 which detects the output signals of various sensors shown in FIG. 2.

First, the ECU 70 determines whether or not the accelerator is OFF, based on a detection signal of an accelerator opening sensor 76 (step S1). When the accelerator is OFF, the number of engine revolution becomes the number of idling revolution, as shown by time t0 to t1 in FIG. 5. Next, the ECU 70 determines whether or not the brake is ON, based on the output of the brake switch 78 (step S2). When the brake is ON, the ECU 70 executes the fuel cut (step S3), and the number of engine revolution goes down as shown by time t1 to t2 in FIG. 5.

While the number of engine revolution is going down, the ECU 70 monitors the number of engine revolution NE based on the output of the engine revolution number sensor 80, and determines whether or not the number of engine revolution NE reaches the predetermined motor setting number of revolution NE2 (step S4). When the number of engine revolution NE reaches the motor setting number of revolution NE2, the ECU 70 switches the driving force of the engine to the motor generator 3 as shown in FIG. 5, and starts the motoring (step S5). The ECU 70 continues the motoring for a predetermined time (step S6). After continuing the motoring for the predetermined time, which corresponds to time from t2 to t3 in FIG. 5, the motoring is stopped (step S7). When the motoring is stopped, the engine rotates by the inertia energy corresponding to the number of engine revolution at that time. As explained above, the reversal of the rotation occurs twice by the compression reaction force and the reaction force of the negative pressure in the cylinder, and finally the engine stops at the optimal crank angle stop position.

It is preferred that the motoring in step S7 is stopped at the time when the predetermined cylinder reaches the top dead center or after the predetermined cylinder passes the top dead center. This is because, when the motoring is stopped before the top dead center, there is a probability that the rotation of the crankshaft is locked at that position.

1ST APPLICATION EXAMPLE

Next, the description will be given of an application example of the engine stop control according to this embodiment. In this embodiment, when the number of engine revolution NE reaches the motor setting number of revolution NE2, the motoring is executed for the predetermined time, so that the number of engine revolution NE becomes the predetermined motor setting number of revolution NE2 when the motoring is stopped. However, the output of the motor generator 3 may lower because of deterioration of the power supply unit (battery), and the number of engine revolution at the time of stopping the motoring may be lower than the motor setting number of revolution NE2. When the number of engine revolution is lower than the motor setting number of revolution NE2, the engine cannot be stopped at the optimal crank angle stop position because the scheduled inertia energy cannot be by driving the motor generator 3, even after the usual motoring stopping timing. Thereby, it is possible that the inertia energy which is insufficient due to the lowered number of engine revolution is supplemented and the engine is stopped at the optimal crank angle stop position.

Figure 8:
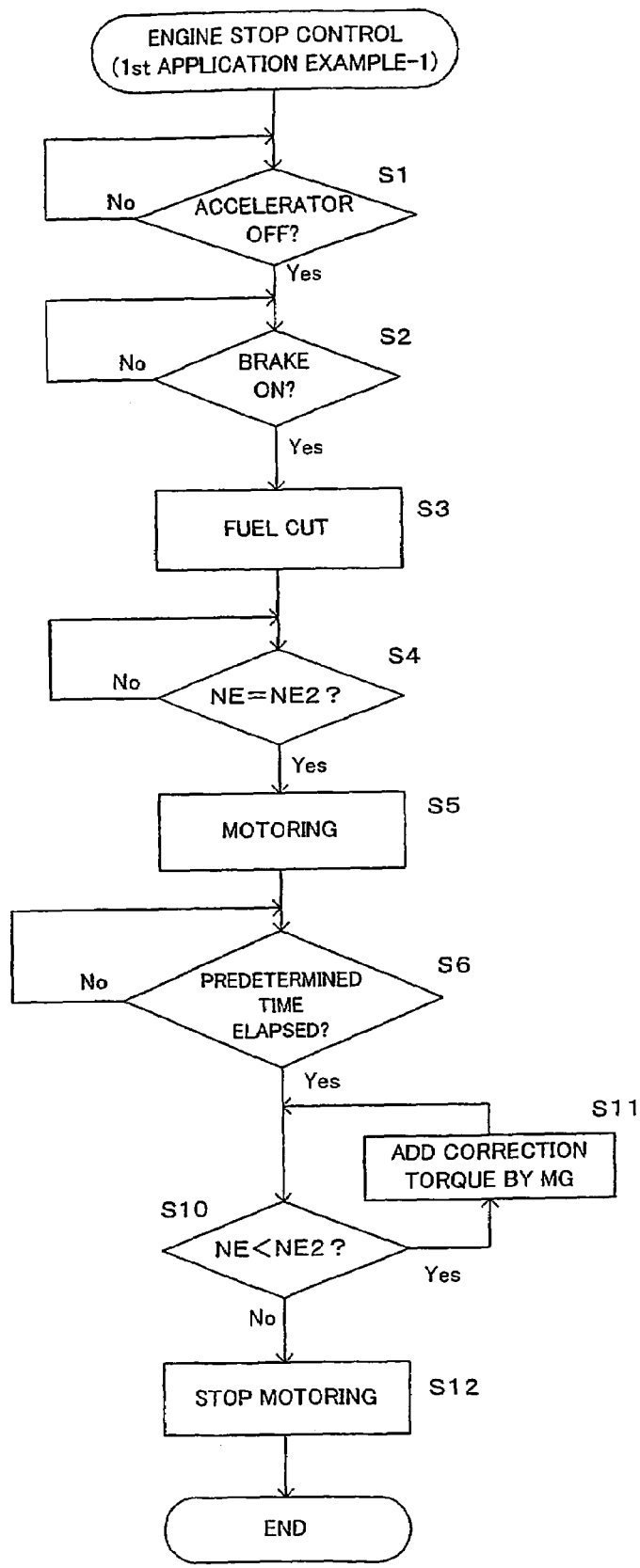
FIG. 8 shows a flow chart of an engine stop control according to the first application example of the first embodiment.

Concretely, there are two methods for adding the correction torque. A flow chart in FIG. 8 shows the first method. In FIG. 8, steps S1 to S6 are identical to the engine stop control in FIG. 7. After the motoring is executed for the predetermined time in steps S5 and S6, the ECU 70 determines whether or not the number of engine revolution NE is lower than the motor setting number of revolution NE2 (step S10). When it is lower, the motoring is not stopped at once and the correction torque is added by the motor generator 3 (step S11). In this case, the motor generator 3 is driven at the number of engine revolution at which the necessary correction torque can be obtained. In a state that the number of engine revolution NE reaches the motor setting number of revolution NE2, the motoring is stopped (step S12).

Figure 9:
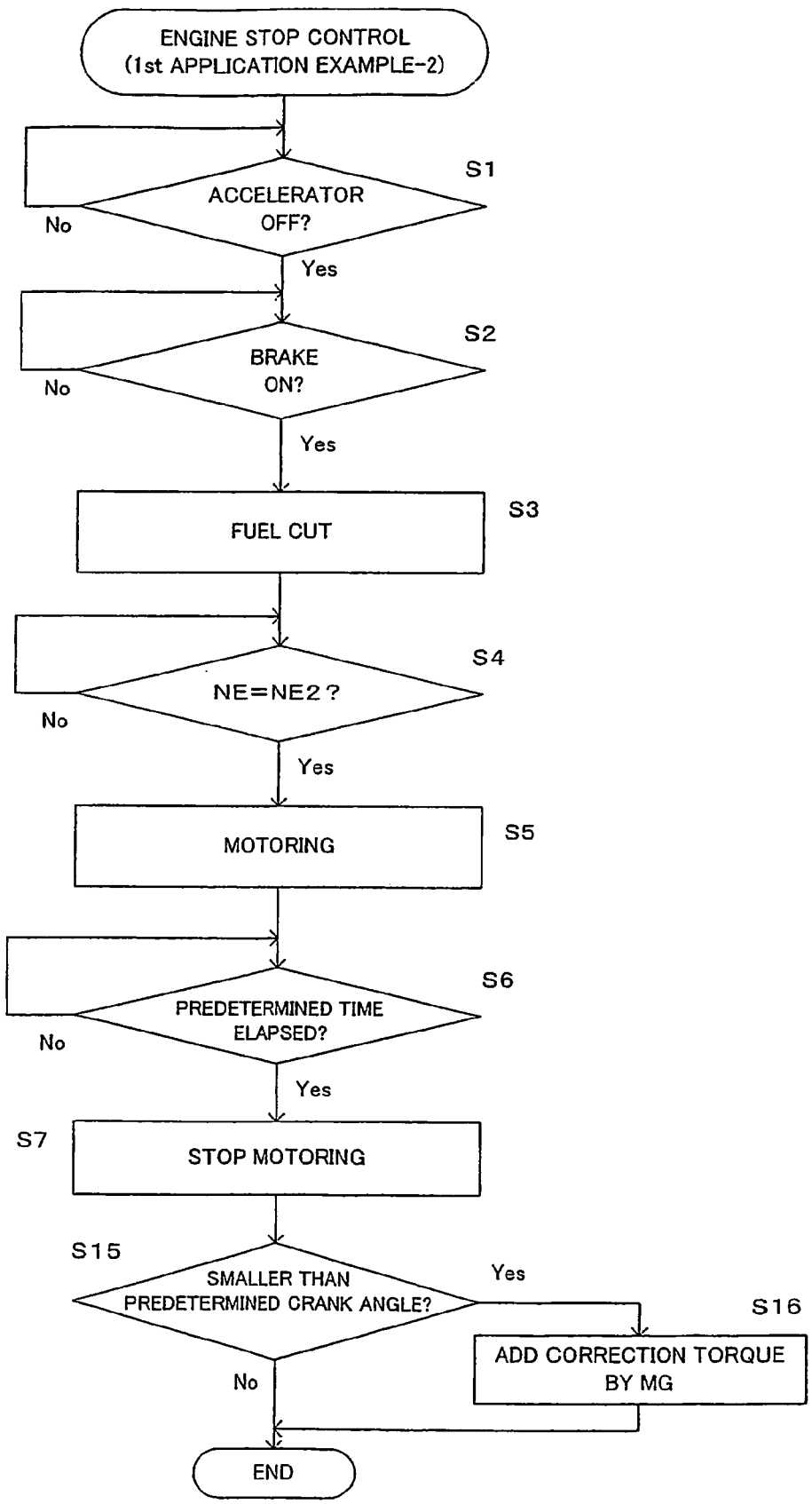
FIG. 9 shows a flow chart of another engine stop control according to the first application example of the first embodiment.

A flow chart in FIG. 9 shows the second method. In FIG. 9, steps S1 to S7 are identical to the engine stop control shown in FIG. 7. After stopping the motoring in step S7, the ECU 70 detects the crank angle at the top dead center at which the motoring is about to be stopped, and determines whether or not the crank angle is lower than the predetermined value (e.g., 140° CA) (step S15). When the crank angle is lower than the top dead center at which the motoring is about to be stopped, the crank angle is not within the suitable range shown in FIG. 6 at the next top dead center of the cylinder. Therefore, it is determined that the engine cannot be stopped at the optimal crank angle stop position, and the correction torque is added by the motor generator 3 (step S16).

As explained above, according to the first application example, if the number of engine revolution is lower than the motor setting number of revolution after stopping motoring, the correction torque by the motor generator 3 is added to reliably execute the stop control.

2ND APPLICATION EXAMPLE

The second application example relates to a processing when engine start is requested during the engine stop control according to the above-described first embodiment. It is noted that the engine restart is requested during the idling stop, for example, when the driver releases the brake, or when the predetermined time elapses from the brake off operation, or when the accelerator is ON, or the like.

First, with reference to a flow chart in FIG. 7, when the engine start is requested during the fuel cut (step S3) in the engine stop control, the ECU 70 may cancel the fuel cut and restart the fuel injection. In this case, if the number of engine revolution is lower than the predetermined number of engine revolution, it is preferred that the assist of the driving force is executed by the motor generator 3 to improve the starting performance.

Next, when the engine start is requested during the motoring (step S5) in the engine stop control, the ECU 70 may restart the fuel injection with continuing the motoring to keep the number of engine revolution, and switch the driving source from the motor generator 3 to the engine 2.

On the other hand, when the engine start is requested after stopping the motoring, it is preferred that the restart is performed after the engine is once stopped at the optimal crank angle stop position by executing the stop control as scheduled. This is because uncertain factors may take place. An example of the uncertain factor is that, if the control is executed by utilizing the motor generator after the motoring is stopped, the engine stops at the position other than at the optimal crank angle stop position, and a large torque is needed for the next restart.

As described above, in the second application example, when the engine start is requested during the engine stop control, it is possible to promptly and reliably correspond the engine start request if the appropriate processing is executed corresponding to the stage of the engine stop control.

When the engine start is requested, the fuel injection may be restarted even during the motoring because the engine stop control is not needed any longer. Conversely, it is preferred that the fuel injection is inhibited during the engines top control, unless the engine start is requested. The reason is as follows. If the fuel injection is performed even if the engine stop control is continued, controlling the number of engine revolution becomes difficult due to the increase of the number of engine revolution by the explosion energy. Accordingly, it becomes difficult to keep the number of engine revolution constant, i.e., to keep the inertia energy of the engine constant, at the time when the motoring is stopped.

3RD APPLICATION EXAMPLE

The third application example relates to a processing in such a case that, even though the above-described engine stop control is executed, inertia energy of the engine after stopping the motoring becomes larger than expected, and the position of the engine is expected to get over the top dead center, which usually cannot be got over by the compression reaction force. According to the engine stop control of the first embodiment, by stopping the motoring after the number of motoring engine is kept to the predetermined motor setting number of revolution by the motoring, the engine is always stopped by the identical inertia energy. After stopping the motoring, the crank angle cannot get over the next top dead center, as explained with reference to FIG. 6, and the crank angle is finally stopped at the predetermined optimal crank angle stop position by the reaction force.

However, after stopping the motoring, if the crank angle is expected to get over the next top dead center by the larger inertia energy of the engine than expected, due to a certain cause, a braking operation is performed by driving the engine in the reverse rotation direction by the motor generator 3. Thereby, the engine can be stopped at the scheduled optimal crank angle stop position by decreasing the inertia energy. On the other hand, if it is still expected that the crank angle gets over the next top dead center irrespective of performing the above brake operation, the rotation of the crankshaft in the normal rotation direction is assisted by the motor generator 3 to get over the next top dead center. After that, the engine stop control may be retried from the step of the motoring.

The ECU 70 can determine whether or not the crank angle gets over the next top dead center, based on values of the number of engine revolution, the variation of the crank angle, the mission range, the oil and water temperature, the negative pressure in the intake pipe, and the like. For example, when the number of engine revolution is higher than scheduled, or when the variation of the crank angle is too large, it can be determined that the crank angle may get over the next top dead center with high probability.

Figure 10:
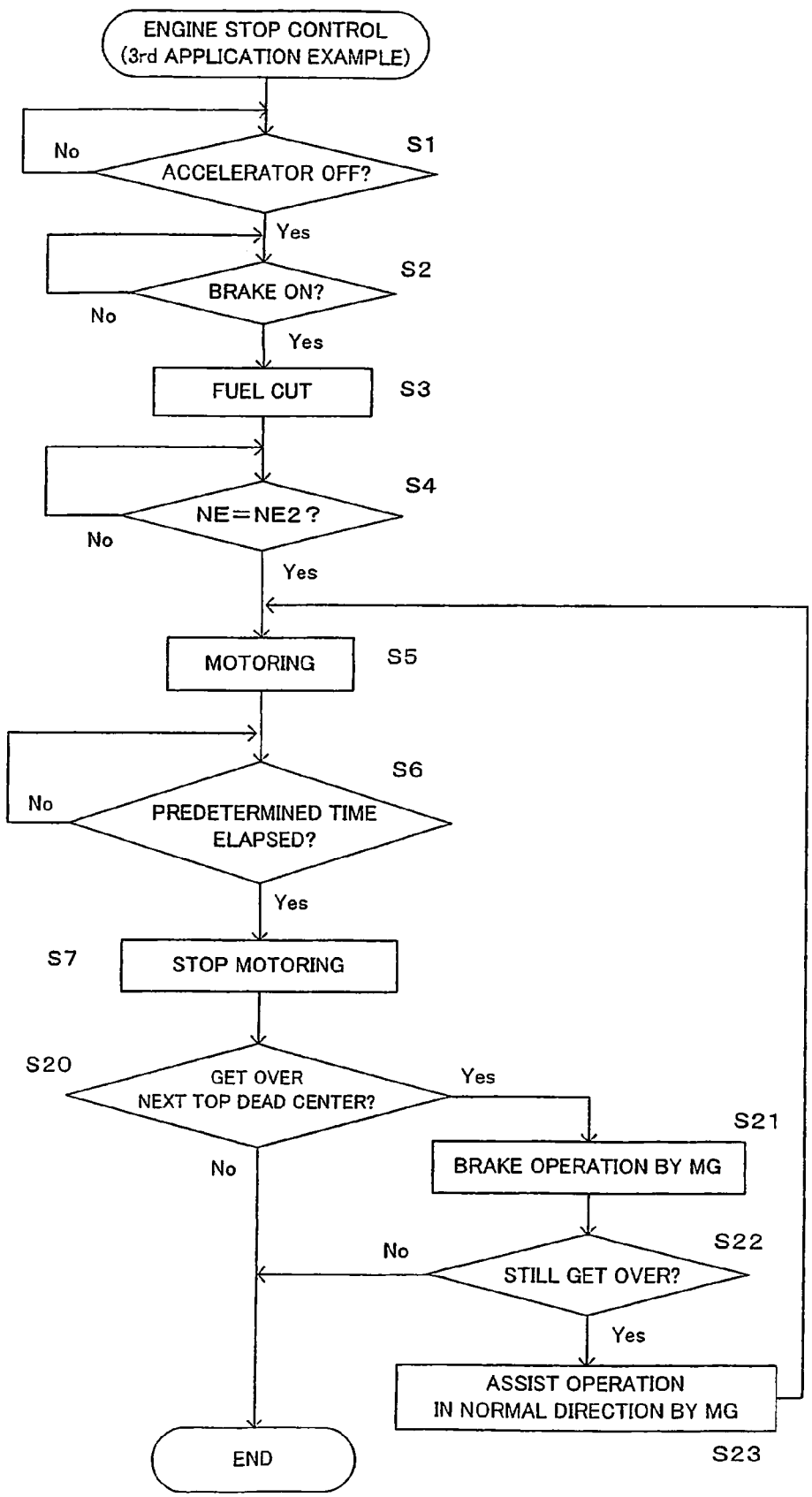
FIG. 10 shows a flow chart of an engine stop control according to the third application example of the first embodiment.

FIG. 10 shows a flow chart of the engine stop control according to this application example. In FIG. 10, steps S1 to S7 until the motoring stop are identical to the processing of the first embodiment shown in FIG. 7. After the motoring is stopped, the ECU 70 determines whether or not the crank angle gets over the next top dead center, based on the detected result, such as the above-described the number of engine revolution (step S20). If it is determined that the crank angle gets over the next top dead center, the ECU 70 performs the brake operation by the motor generator 3, and determines again whether the crank angle still gets over the next top dead center (step S22). If it is determined that the crank angle still gets over the next top dead center even after the brake operation operation, the ECU 70 execute the assist in the normal direction by the motor generator 3, and returns to step S5 to try the processing again from the motoring.

As described above, in this example, when the engine stop control is executed as scheduled, if it is determined that the crank angle gets over the next top dead center by a certain cause, the reliability of the stop position control can be improved by performing the brake operation and the assist operation and the like by the motor generator 3.

4TH APPLICATION EXAMPLE

The forth application example is a processing by taking account of the number of idling revolution in the above-described engine stop control. In the above-described engine stop control, when the accelerator is made OFF, the number of engine revolution becomes the number of idling revolution NE1, as shown in FIG. 5. Here, the ECU 70 checks the number of idling revolution NE1, and does not execute the engine stop control when the number of idling revolution NE1 is larger than the predetermined number of revolution (e.g., it is prescribed as NE3). Concretely, when the number of idling revolution NE1 is larger than the predetermined number of engine revolution NE3, the ECU 70 does not set the fuel cut signal (engine stop permission signal) to H level, and does not execute the fuel cut. The reason is as follows. When the number of idling revolution NE1 is too high, since the time period from the fuel cut until the engine stop becomes longer, the negative pressure in the intake pipe is almost equivalent to the atmospheric pressure, and the negative pressure is insufficient. As a result, the load of the motoring by the motor generator 3 increases, the control of the number of engine revolution becomes unstable, and finally it is possible that the engine is not stopped at the optimal position. Therefore, the ECU 70 checks the number of idling revolution NE1, and does not output the fuel cut signal when the number of idling revolution is larger than the predetermined number of engine revolution NE3, so as to avoid the failure of the above-described stop control.

On the other hand, when the detected number of idling revolution is smaller than the predetermined value (e.g., it is prescribed as NE4), the ECU 70 increases the fuel for injection without performing the fuel cut at once, thereby to increase the number of engine revolution, even though the brake is ON. Then, the ECU 70 outputs the fuel cut signal when the number of engine revolution becomes larger than the predetermined value NE4, and executes the fuel cut, and executes the engine stop control thereafter. If the number of idling revolution is too low when the accelerator is OFF, the negative pressure in the intake pipe is still large near the time of stopping the engine. As a result, the compression reaction force becomes small, and it is presumed that stopping the engine at the optimal position with the inertia energy becomes difficult. Therefore, when the number of idling revolution is smaller than the predetermined value NE4, first, the number of engine revolution is increased to the predetermined value NE4 by increasing the fuel injection amount, and then the motoring is stopped to execute the engine stop control.

Figure 11:
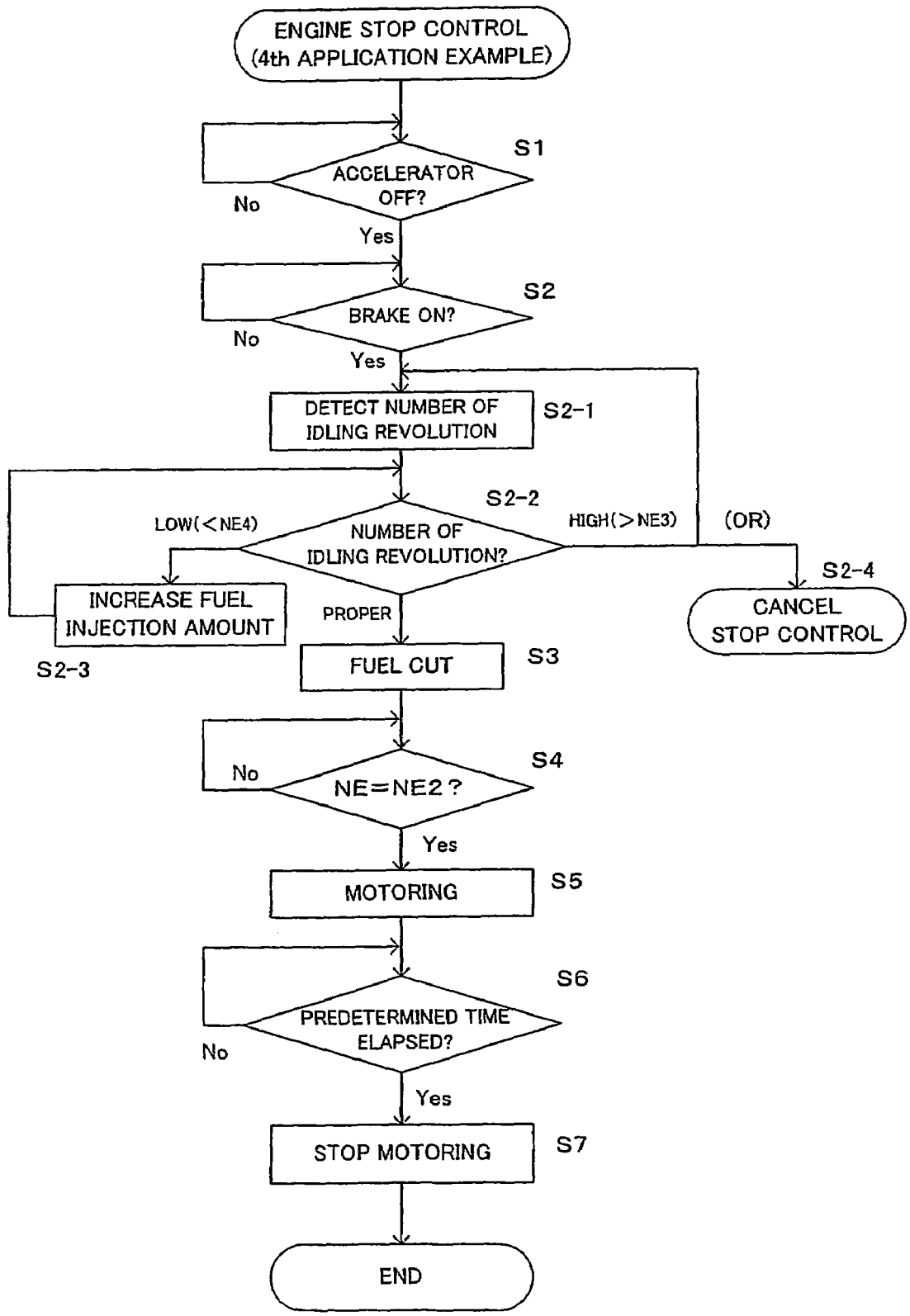
FIG. 11 shows a flow chart of an engine stop control according to the forth application example according to the first embodiment.

The above-described processing is explained with reference to a flow chart in FIG. 11. In FIG. 11, steps S1 to S7 are basically identical to the processing of the basic engine stop control of the first embodiment shown in FIG. 7. In FIG. 11, after the brake is made ON in step S2, the ECU 70 detects the number of engine revolution (the number of idling revolution) (step S2-1), and determines whether the detected number is proper, or larger than the predetermined value NE3 or smaller than the predetermined value NE4 (step S2-2). When the detected number is proper, the processing moves to step S3, and performs the fuel cut to continue the engine stop control. On the other hand, when the number of idling revolution is too high, i.e., higher than the predetermined value NE3, the processing returns to step S2-1 to wait for the number of idling revolution to lower, or cancels the engine stop control itself (step S2-4). Even if the engine stop control is canceled, it only means that the idling stop of the vehicle is not executed, and there is no particular problem. When the number of idling revolution is lower than the predetermined value NE4, the ECU 70 increases the fuel injection amount (step S2-3), and increases the number of engine revolution to the proper value. After that, the fuel cut is performed (step S3).

As explained above, in the fourth application example, a probability of the successful engine stop control can be increased, when the number of idling revolution after the accelerator off is too high and too low.

5TH APPLICATION EXAMPLE

The fifth application example is based on the engine stop control according to the first embodiment and is to shorten the energizing time to the motor generator during the motoring by unifying the cylinders subjected to the fuel cut. Concretely, in executing the engine stop control of the first predetermined number, the cylinder subjected to the fuel cut is randomly determined, and the engine stop control according to the first embodiment is executed by performing the fuel cut for the determined cylinder. At this time, an actual energizing time to the motor generator is recorded for each cylinder. After the predetermined number of engine stop control is executed, the fuel cut is performed for the cylinder having the shortest energizing time to the motor, according to the record until then.

Thereby, if the fuel cut is performed by the specific cylinder among the plurality of cylinders in the engine 2, the energizing time to the motor generator can be the shortest.

It is noted that the cylinder subjected to the fuel cut can be determined not only by the above-described motor energizing time, but also by taking account of the number of idling revolution, the mission range, the past stop situation, a cylinder pressure estimated result by air pressure, the oil and water temperature, and the like.

2nd Embodiment

Next, the second embodiment of the present invention will be explained. In the above-described first embodiment, at the time of the idling stop, the number of engine revolution is kept within the predetermined range by motoring after performing the fuel cut of the engine. Then, the motoring is stopped, and the engine is controlled at the optimal stop position by the inertia energy.

To the contrary, in the second embodiment, a transition of the ideal number of engine revolution for stopping the engine at the optimal stop position is preset. After the fuel cut, while monitoring the number of engine revolution, the brake and the assist operation are performed by the motor generator as the need arises to control the actual number of engine revolution to follow the ideal number of engine revolution.

Figure 12:
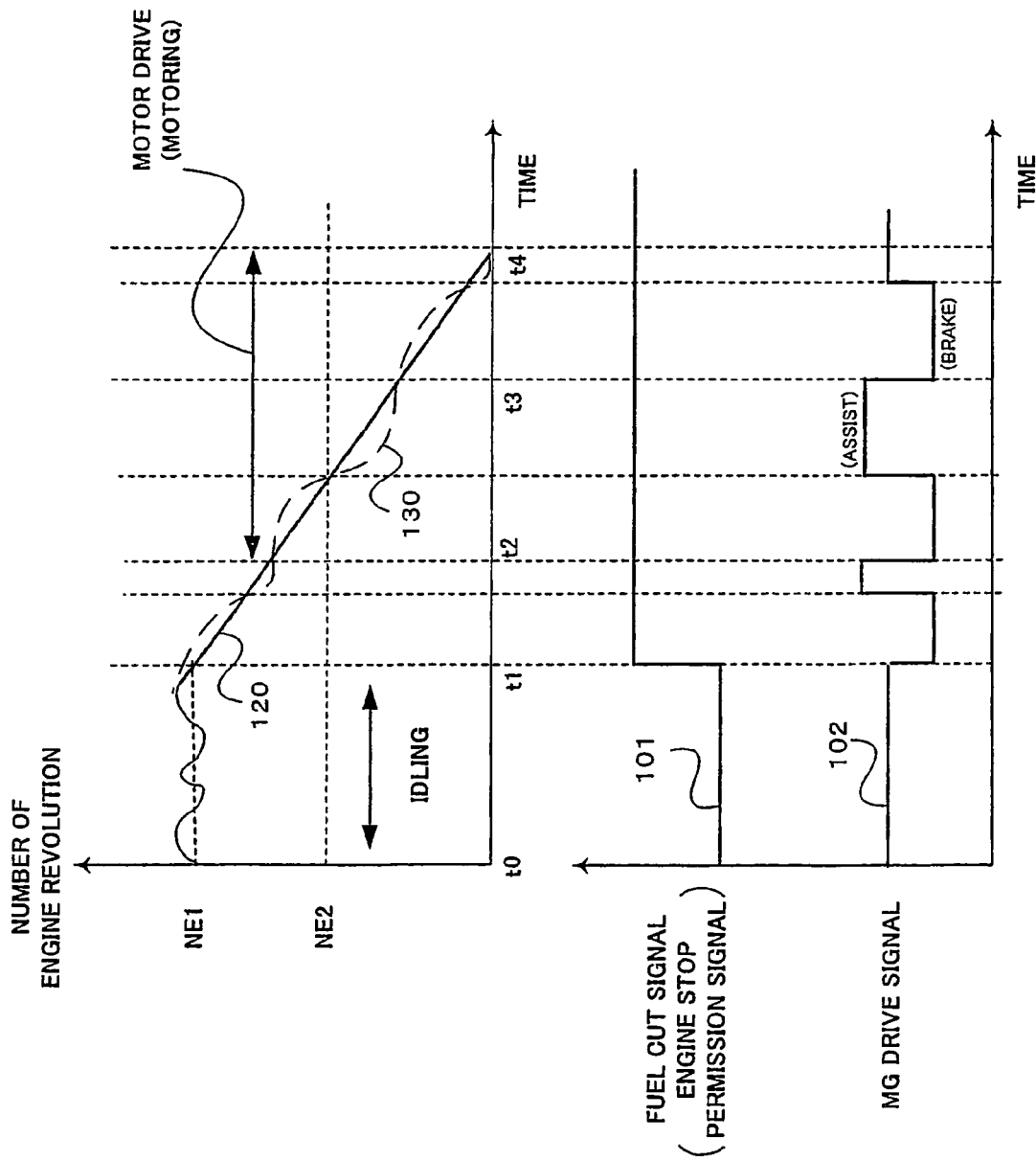
FIG. 12 is a graph showing a transition of a number of engine revolution during an engine stop control according to the second embodiment.

FIG. 12 shows a variation example of the number of engine revolution during the engine stop control according to the second embodiment. In a graph of the number of engine revolution in FIG. 12, the solid line 120 indicates an ideal transition of the number of engine revolution in the embodiment, and the broken line 130 indicates an actual transition of the number of engine revolution. In the embodiment, an assist/brake operation by the motor generator is performed so that the actual number of engine revolution follows the ideal transition line 120 of the number of engine revolution. It is noted that "assist" is to give the driving force in the normal rotation direction of the engine by the motor generator, and "brake" is to give the driving force in the reverse rotation direction of the engine by the motor generator.

In FIG. 12, the accelerator of the vehicle is made OFF at time t0, the brake is set ON at time t1, and the ECU 70 performs the fuel cut. Though the number of engine revolution is automatically decreased after the fuel cut, the ECU 70 determines whether or not the number of engine revolution is on the ideal transition line 120 of the number of engine revolution by continuously monitoring the number of engine revolution. When the actual number of engine revolution deviates from the ideal transition line 120 of the number of engine revolution, the ECU 70 performs the assist or brake operation by driving the motor generator 3 to follow the ideal transition line 120 of the number of engine revolution by increasing or decreasing the actual number of engine revolution. Finally, by removing the driving force by the motor generator 3 at the predetermined number of engine revolution, the engine is stopped at the optimal crank angle stop position by utilizing the inertia energy.

According to the method, if the ideal transition line of the number of engine revolution is preset so that the engine can be stopped at the optimal crank angle stop position with high probability, and the actual number of engine revolution is controlled to follow the line by the assist/brake operation by the motor generator, the engine stop control can be stably executed. Since the number of engine revolution is controlled on real-time basis by the motor generator, stable engine stop control can be realized, even when the number of engine revolution is unstable by a certain temporary cause.

Figure 13:
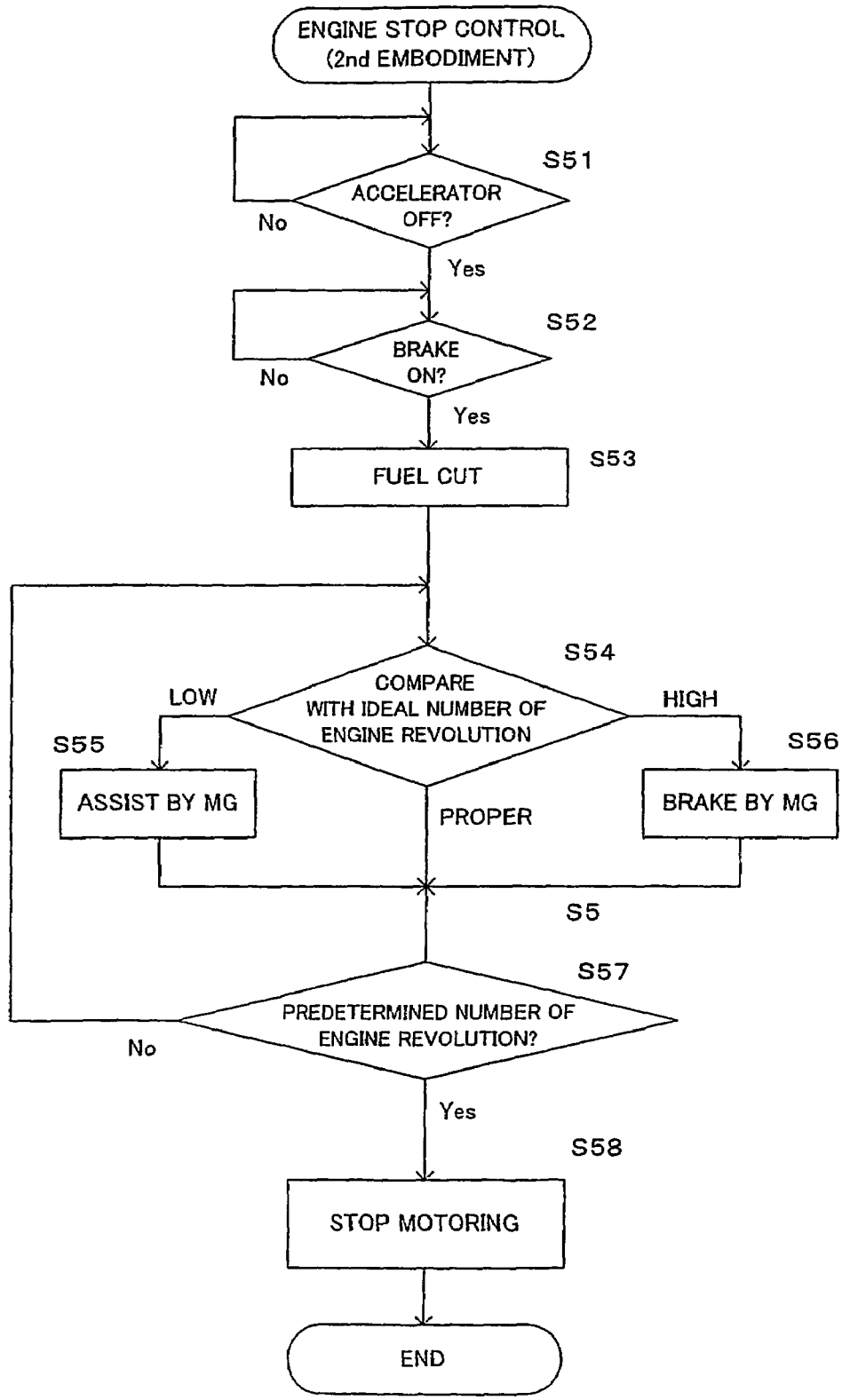
FIG. 13 shows a flow chart of an engine stop control according to the second embodiment.

FIG. 13 shows an example a flow chart of the engine stop control according to the second embodiment. In FIG. 13, steps S51 to S53 are identical to steps S1 to S3 of the engine stop control of the first embodiment shown in FIG. 7. When the fuel cut is performed, the ECU 70 detects the number of engine revolution, and compares the number of engine revolution with the ideal number of engine revolution which is prescribed by the ideal transition line 120 of the number of engine revolution (step S54). When the actual number of engine revolution is lower than the ideal number of engine revolution, the assist operation is performed by the motor generator 3 (step S55). When the actual number of engine revolution is higher than the ideal number of engine revolution, the brake operation is performed by the motor generator 3 (step S56). When the actual number of engine revolution is proper, the driving by the motor generator 3 is not executed. In that way, the actual number of engine revolution is controlled to follow the ideal line 120 of the number of engine revolution, and when the number of engine revolution reaches the predetermined number of engine revolution (step S57; Yes), the motoring is stopped (step S58). Afterward, the engine stops at the optimal crank angle stop position by the inertia energy of the engine.

3rd Embodiment

The third embodiment is based on the engine stop control and is to improve control accuracy by removing as many energy loads as possible. This embodiment can be applied to both the first and second embodiments.

If the engine load, such as auxiliary machines and the like, is large when executing the engine stop control according to the present invention, the fuel consumption improving effect by the idling stop becomes low because the energy for controlling the number of engine revolution is large. Also, if there is any engine load, the number of engine revolution can vary dependently upon the variation of the load. As a result, controlling the number of engine revolution is unstable, and finally the probability that the engine stop control fails becomes higher. Therefore, in this embodiment, when starting the engine stop control, the engine load is made as small as possible.

"Engine load" includes various kinds of loads, for example, an air conditioner, an electric power steering, front lights and so on. Namely, as the processing for reducing the engine load, inhibiting the power generation by a generator, switching off the front lights, and inhibiting the air conditioner operation are included, for example. As things affecting the number of engine revolution, the ON/OFF control of a control valve (it is called "ISC") which is provided in the engine for adjusting the number of idling revolution, and electron throttle control are also included in the engine load.

As described above, by making the engine load as small as possible when executing the engine stop control, the number of engine revolution can be controlled with high accuracy, and the engine stop control can be more reliably executed. Also, the energy needed for controlling the number of engine revolution can be reduced. Concretely, in the first embodiment, by making the engine load small, the accuracy of controlling the number of engine revolution by the motoring can be improved. In the second embodiment, the accuracy for making the actual number of engine revolution follow the ideal transition line of the number of engine revolution can be improved by driving the motor generator.

Figure 14:
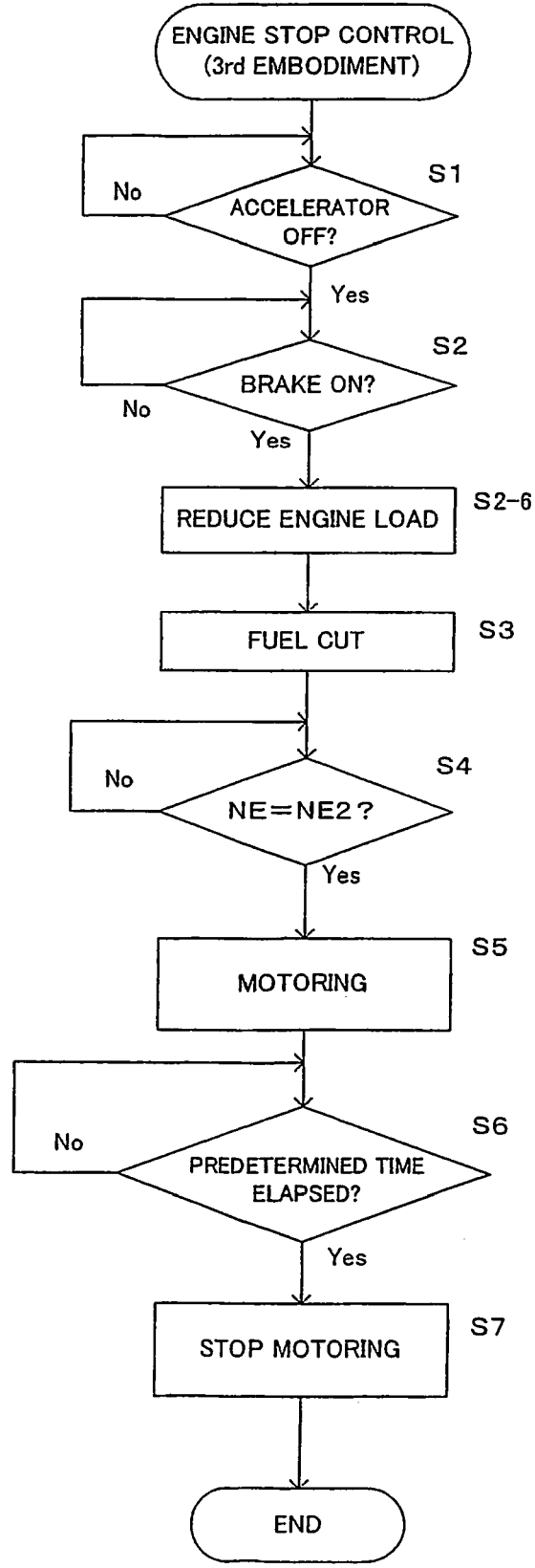
FIG. 14 shows a flow chart of an engine stop control according to the third embodiment.

FIG. 14 shows an example of a processing flow chart of a case that the embodiment is applied to the first embodiment. Steps S1 to S7 in FIG. 14 are identical to the engine stop control of the first embodiment shown in FIG. 7, and the embodiment is different from the first embodiment only in that steps S2-6 is inserted. Namely, when the brake operation is detected in step S2, the ECU 70 executes the above-described processing for reducing the engine load (step S2-6), and the number of engine revolution is controlled by performing the fuel cut. Thereby, the control of the number of engine revolution can be executed with high accuracy.

It is noted that the processing in step S2-6 shown in FIG. 14 may also be added after step S52 in FIG. 13 when this embodiment is applied to the second embodiment.

Though the fuel cut is performed at the time of brake operation in the above-described examples, it is also possible that the fuel cut in the engine stop control is performed at other timing.

As explained above, according to the engine stop control of the present invention, by controlling the number of engine revolution with the motor generator at the idling stop time, the engine is stopped at the optimal crank angle stop position by utilizing the inertia energy of the engine. Therefore, the accuracy of the engine stop control can be improved, and the energy needed for the stop control can also be reduced.

[Engine Stop and Start Control]

Next, an engine stop and start control according to the present invention will be described. The engine stop and start control of the invention enables early ignition start of the engine.

According to the aforementioned engine stop control, it is possible to estimate, before the engine actually stops, at which stroke each cylinder stops at the time of engine stop. As shown in FIG. 5, in the above-described engine stop control, a predetermined motoring period is provided after the fuel cut to keep the number of revolution of the engine 2 at a predetermined number of revolution, whereby the inertia energy which the engine 2 has is made constant at that point of time, and thereafter the motoring is finished to remove the driving force of the engine 2 to stop the engine 2. Consequently, how many times the engine 2 rotates until it stops after the motoring is finished depends on the inertia energy which the engine 2 has when the motoring is finished, i.e., the number of engine revolution kept by the motoring, the motoring period and the like. Conversely, since the number of revolution during the motoring is kept constant, how many times the engine rotates before the engine (i.e., crankshaft) stops after the motoring is finished always becomes constant.

Consequently, if it is detected to which stroke each of the cylinders belongs at the time of starting the motoring by the cylinder discrimination utilizing the aforementioned cam angle sensor 92 and the like, it can be estimated in which stroke each of the cylinder is when the engine finally stops after the motoring is carried out for a predetermined motoring period. For example, if the inertia energy at the time of finishing the motoring, i.e., the number of engine revolution at the time of finishing the motoring is determined so that, for example, a certain cylinder at a specific stroke at the time of finishing the motoring can get over the next compression top dead center, but cannot get over the second compression top dead center, the cylinder is in the compression stroke when the engine 2 stops. It is known, from the motoring period, how many times the engine 2 rotates during the motoring period. Consequently, the ECU 70 can estimate, during execution of the engine stop control, which stroke each of the cylinders are in, at the time of engine stop, based on the information of the stroke of each of the cylinders at the time of the motoring stop or at the time of the motoring start, and the information indicating how many times the engine 2 rotates by the inertia energy after the motoring is finished. In the stop and start control of the engine 2 of the present invention which will be described hereinafter, an air-fuel mixture is introduced and sealed in the cylinder, which is estimated to be in a specific stroke after the engine stop, before the engine stop by utilizing the estimation result.

Next, the stop and start control of the engine for early ignition start according to the present invention will be described.

4th Embodiment

A fourth embodiment is to perform early start of the engine 2 by previously performing fuel injection to a cylinder which is estimated to stop in the compression stroke at the time of engine stop to seal the mixture in the combustion chamber, when carrying out the engine stop control at the aforementioned optimal crank angle stop position, and by igniting the mixture in addition to the cranking by the motor generator, at the time of engine start.

First, a basic principal of the embodiment will be explained. In the first method, for example, at the time of engine stop such as the idling stop, the aforementioned engine stop control is performed and it is estimated which stroke each of the cylinder is in at the time of engine stop. Thus, the cylinder that is estimated to be in the compression stroke when the engine stops is specified. It can be estimated, by the aforementioned method, which stroke each of the cylinders are in at the time of engine stop.

In a port injection type engine as in the first method, since both the intake and the exhaust valves are normally in the closed state in the cylinder in the compression stroke during engine stop, the mixture cannot be introduced to the combustion chamber of the cylinder after the engine stops, unlike a so-called direct injection type engine. For this reason, in order to introduce and seal the mixture in the combustion chamber of the cylinder estimated to be in the compression stroke at the time of engine stop (hereinafter, also called "stop time compression stroke cylinder"), it is necessary to perform fuel injection in advance at the intake stroke of the cylinder. Consequently, when, for example, #3 cylinder is estimated to be in the compression stroke at the time of engine stop, the ECU 70 performs the fuel injection for the cylinder in the intake stroke preceding the compression stroke, and seals the mixture in the combustion chamber in advance. At the point of time when this fuel injection is performed, the engine is not stopped yet, and the inside of the combustion chamber of the cylinder in the intake stroke is under negative pressure. Therefore, the mixture containing fuel injected in the intake port can be reliably introduced into the combustion chamber. As a result, the engine stop control is completed, and when the engine stops, the mixture is sealed inside of the combustion chamber of the stop time compression stroke cylinder (#3 cylinder in this example).

At the time of engine start, the ECU 70 performs cranking by the motor generator 3, and ignites the stop time compression stroke cylinder (#3 cylinder) to generate explosion energy to rotate the crankshaft, whereby the early start of the engine 2 can be performed.

The mixture which is thus sealed in the stop time compression stroke cylinder at the time of engine stop has a favorable air-fuel ratio based on the A/F sensor output during engine stop control, i.e., before the engine stop. Also, as described in the explanation of the aforementioned engine stop control, since the rotation of the engine is reversed immediately before the engine is stopped by utilizing the inertia energy, the sealed mixture is subjected to the repeated compression and expansion by the piston in the combustion chamber, and is in a state in which air and fuel are mixed well. Further, the engine is still in a warmed-up state after the engine stops, and therefore the mixture generates convection inside the combustion chamber by receiving heat from the cylinder, which promotes mixing of the air and the fuel. For these reasons, the atomized homogenous mixture is kept in the combustion chamber, and the mixture is in an easily ignitable state. Consequently, the mixture is combusted smoothly by the ignition at the time of the engine start, and the early start of the engine can be achieved.

Figure 15:
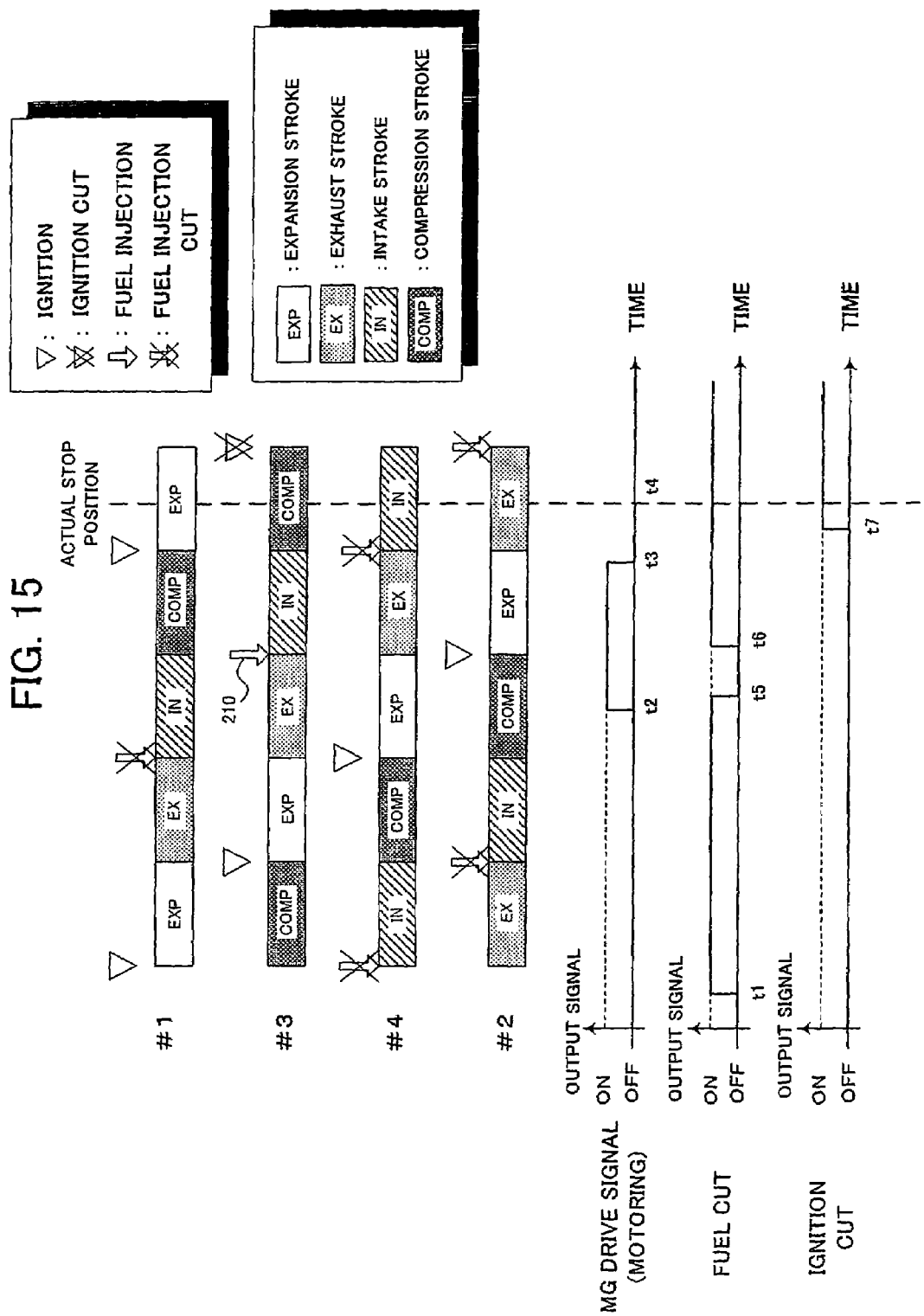
FIG. 15 shows an example of engine stop control according to a fourth embodiment of the present invention.
Figure 16:
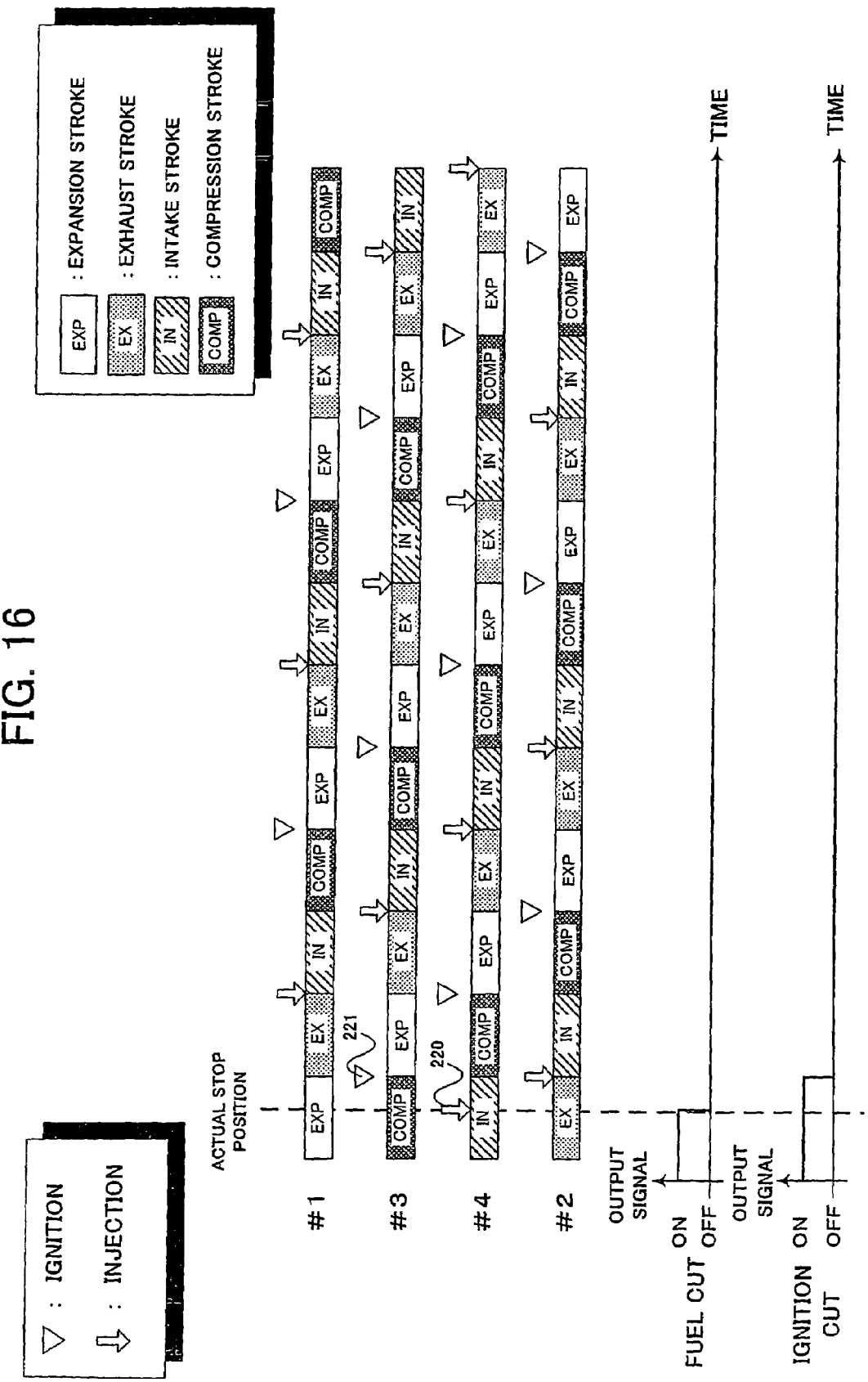
FIG. 16 shows an example of engine start control according to the fourth embodiment of the present invention.

Next, the fourth embodiment will be explained in detail with reference to FIGS. 15 to 18. First, the description will be given of a method of the stop control for the early ignition start according to the fourth embodiment of the engine start and stop control according to the invention. FIG. 15 shows an example of the stop control according to the embodiment, and FIG. 16 is a flow chart thereof.

FIG. 15 is a stroke chart showing a state of each of the cylinders just before the engine stops, and a time chart corresponding to the stroke chart. In FIG. 15, the stop time compression stroke cylinder is assumed to be the #3 cylinder. In the first method, an example of a four-cylinder engine is described, but the application of the present invention is not limited to this. The firing order of the engine 2 is, for example, #1 cylinder-#3 cylinder-#4 cylinder-#2 cylinder, but the application of the present invention is not limited to this.

The engine stop control here is basically the same as what is explained above with reference to FIG. 5 and FIG. 6. Namely, after the driver releases the accelerator, the fuel cut signal is turned on at the time of braking (time t1), and the fuel cut is performed. As a result, the fuel injection is not performed after the time t1 as a rule. Thereafter, when the number of engine revolution goes down to a predetermined number, the MG drive signal is turned on at time t2, and the motoring is started. After a predetermined time elapses, the motoring finishes at time t3, and thereafter the engine shows the behavior shown in FIG. 6 and stops at time t4. The position at which the engine stops is shown by the broken line as an actual stop position in FIG. 15.

In the engine stop state, the #3 cylinder which is the stop time compression stroke cylinder is in the compression stroke. The ECU 70 already estimates this during engine stop control, for example, at the time of starting the motoring. The ECU 70 performs fuel injection to the #3 cylinder, which is the stop time compression stroke cylinder, in the intake stroke just before the engine stop (see the arrow 210). Namely, as known with reference to the fuel cut signal, though the fuel injection is not performed after the level change of the fuel cut signal as a rule, the fuel cut is temporarily intermitted and the fuel is exceptionally injected (time t5 to t6) only while the stop time compression stroke cylinder belongs to the intake stroke just before the engine stop, in order to introduce and seal the mixture in the stop time compression stroke cylinder. As a result, the mixture is sealed in the #3 cylinder which is in the compression stroke at the time of engine stop. In the vicinity of the engine stop at the time t4, the ECU 70 turns on the ignition cut signal, and stops the ignition in all the cylinders.

Next, the start control performed after the engine stops in that way will be explained with reference to FIG. 16. FIG. 16 is a stroke chart showing an example of the start control of the engine 2 after the engine stop control. The actual stop position shown in FIG. 16 is the same as the actual stop position shown in FIG. 15.

As shown in FIG. 8, the #4 cylinder is in the intake stroke at the actual stop position. Consequently, in order to carry out early start of the engine 2, the ECU 70 turns off the fuel cut signal when the engine start condition is established, and executes fuel injection through the EFI into the combustion chamber of the #4 cylinder in the intake stroke (see the arrow 220).

In the actual stop position, the #3 cylinder is in the compression stroke as mentioned above, and the mixture is sealed in the combustion chamber of the #3 cylinder. Consequently, the ECU 70 ignites the mixture sealed in the combustion chamber of the #3 cylinder to rotate the crankshaft (see the arrow 221). Specifically, the ECU 70 shifts the ignition cut signal from ON to OFF when the engine starting condition is established, and transmits the ignition command signal to the igniter when the #3 cylinder reaches the compression top dead center. By this, the ECU 70 rotates the crankshaft by the combustion pressure generated at that time. Thereafter, the fuel injection and ignition are executed as usual.

As described above, according to the fourth embodiment, at the time of the engine start, the mixture sealed in the stop time compression stroke cylinder at the time of engine stop is combusted to generate explosion energy to drive the crankshaft, in addition to the cranking by the motor generator. Thus, early initial explosion of the engine 2 is realized, and the engine can be started quickly.

Next, a flow chart of the stop control according to the fourth embodiment will be explained with reference to FIG. 17. The ECU 70 basically executes the control, based on the output signal from various sensors.

In sequence, in step S71, the ECU 70 determines whether or not the engine stop condition is satisfied, by monitoring the output signal state of the brake pedal switch and whether or not the number of engine revolution is equivalent to the predetermined number of engine revolution as a determination standard. Concretely, when the brake switch interlocking the brake pedal is ON and the number of engine revolution is in the predetermined range of number of engine revolution (e.g., around 0(rpm)), the ECU 70 determines that the engine stop condition is satisfied based on the output signal from the sensors detecting those states (step S71; Yes). Thereby, the processing moves to step S72. On the other hand, when the brake switch is OFF or the number of engine revolution is not in the predetermined range of number of engine revolution (e.g., about 0(rpm)), the ECU 70 determines that the engine stop condition is not satisfied, based on the output signals from the sensors detecting those state (step S71; No). Therefore, until the engine stop condition is satisfied, the processing does not move to step S72.

Next, in step S72, the ECU 70 performs the fuel cut to each cylinder. In step S73, the ECU 70 determines whether or not starting the motoring is possible, by comparing the number of engine revolution with the predetermined number of engine revolution. When the number of engine revolution becomes smaller than the predetermined number of engine revolution, the processing moves to step S74, the ECU 70 drives the motor generator 3 via the motor control unit 4 to stat the motoring (step S73; Yes). Concretely, the ECU 70 sends a command signal corresponding to a predetermined motoring execution period to the motor control unit 4, and the motor control unit 4 controls the motor generator 3 based on the command signal. Thereby, the motoring is executed for the predetermined time period. On the other hand, when the number of engine revolution is larger than the predetermined number of engine revolution, the processing does not move to step S74 until the number of engine revolution becomes smaller than the predetermined number of engine revolution (step S73; No).

Next, in step S75, as described above, the ECU 70 estimates the stop time compression stroke cylinder, based on the cylinder determination signal at the time of starting the motoring and the above-mentioned predetermined motoring execution period. It is noted that the ECU 70 estimates #3 cylinder to be the stop time compression stroke cylinder in the embodiment. Afterward, in order to perform the fuel injection in the intake stroke of the cylinder immediately before the engine stop, the ECU 70 continuously detects in which stroke #3 cylinder is, based on the output signal from the cam angle sensor 92. In step S76, the ECU 70 determines whether or not the stop time compression stroke cylinder, i.e., #3 cylinder, is in the intake stroke. When #3 cylinder is in the intake stroke, the processing moves to step S77 (step S76; Yes). On the other hand, while #3 cylinder is not in the intake stroke, the processing does not move to step S77 until #3 cylinder comes to the intake stroke (step S6; No).

Next, in step S77, the ECU 70 executes the fuel injection of the predetermined amount, via the EFI, to the combustion chamber of the stop time compression stroke cylinder, i.e., the combustion chamber of #3 cylinder in the intake stroke. When the fuel injection is completed (step S78; Yes), the processing moves to step S79.

Next, in step S79, when the ECU 70 detects a motoring stop command signal from the motor control unit 4, the processing moves to step S80 to stop the motoring. The motoring stop command signal is transmitted from the motor control unit 4 to the ECU 70, when the predetermined motoring execution period set in step S74 has elapsed. On the other hand, the processing does not move to step S80 until the motoring stop command signal is detected (step S79; No). Next, in step S81, the ECU 70 executes the ignition cut to each cylinder, via the EFI. Afterward, the engine 2 shows the behavior as shown in FIG. 6 and stops (step S82).

In that way, by the stop control of this invention, the crank angle becomes the optimal crank angle position, and the engine stops with the mixture being introduced and sealed in the combustion chamber of the stop time compression stroke cylinder.

Figure 18:
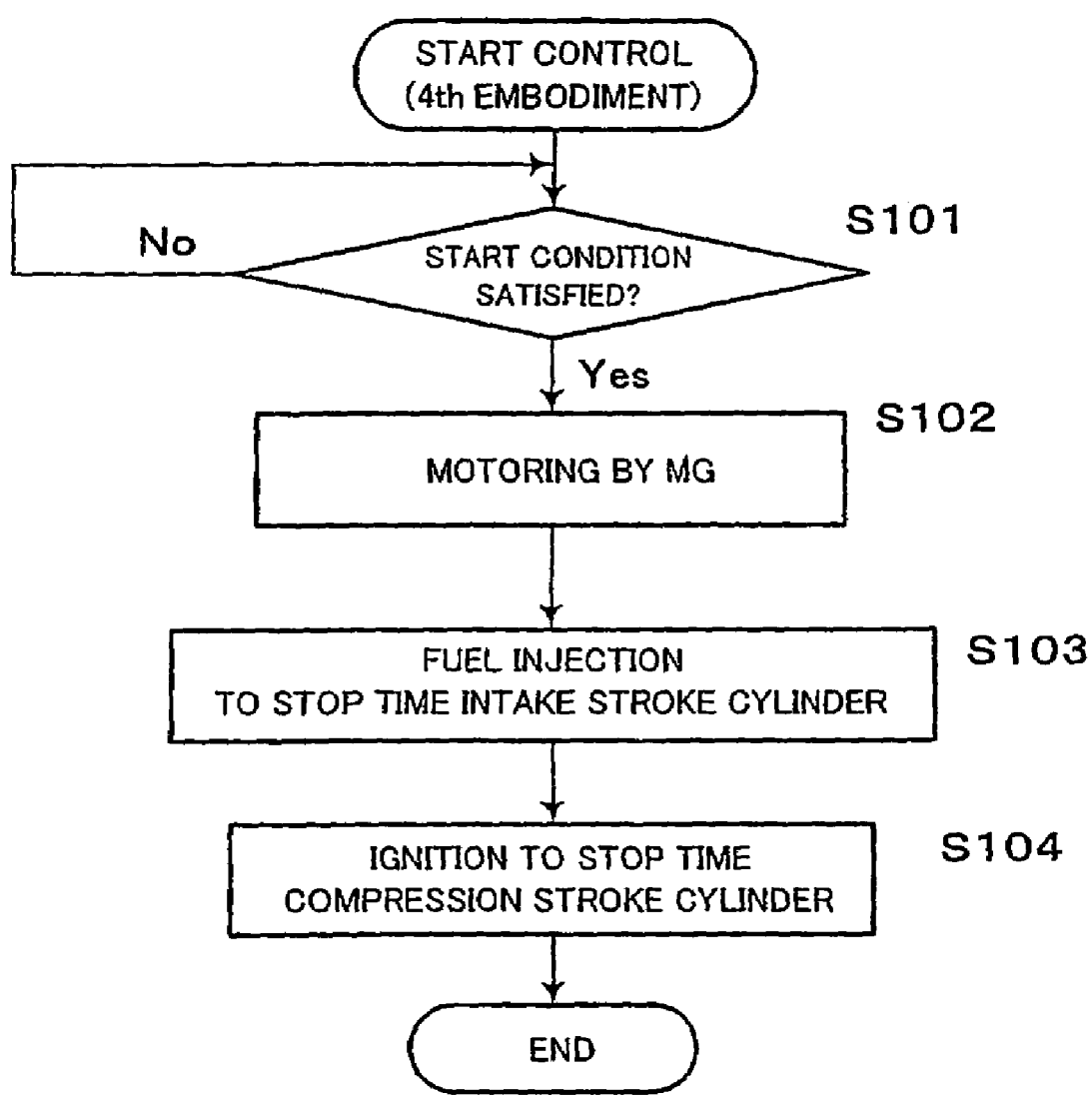
FIG. 18 is a flow chart of an engine start control according to the fourth embodiment.

Next, the description will be given of a flow chart of the engine start control according to the fourth embodiment, with reference to FIG. 18. First, in step S101, the ECU 70 determines whether or not the predetermined engine start condition is satisfied, e.g., the ignition switch is ON and the brake pedal switch is ON (step S101). When the engine start condition is satisfied, the ECU 70 executes the motoring (cranking) by the motor generator 3 (step S102). Also, the ECU 70 detects a cylinder in the intake stroke at the time of the engine stop (hereafter, it is also called "stop time intake stroke cylinder"), based on the output signal from the cam crank sensor 92 and the like, and executes the fuel injection (step S103). Further, the ECU 70 executes the ignition to the stop time compression stroke cylinder (step S104). Since the mixture is introduced and sealed in the stop time compression stroke cylinder as described above, the combustion starts at once, and the revolution of the crankshaft can be obtained by the explosion energy. Thereby, it becomes possible that the time until the first explosion is quite shortened to realize the early ignition start of the engine 2. In that way, the engine 2 starts.

As explained above, according the fourth embodiment of the engine stop and start control of the present invention, by estimating, during the engine stop control, the cylinder in the compression stroke at the time of the engine stop, the mixture is introduced into the combustion chamber by injecting the fuel into the cylinder. Therefore, at the time of the engine start, the combustion can be started at once in that cylinder to early start the engine.

5th Embodiment

The fifth embodiment is intended to realize early ignition start of the engine 2 more quickly, by utilizing the engine stop and start control according to the aforementioned fourth embodiment as a base. Specifically, in the fifth embodiment, the fuel injection is performed, in advance, for the cylinder estimated to stop in the expansion stroke at the time of engine stop (hereinafter, also called "stop time expansion stroke cylinder") thereby to seal the mixture at the time of engine stop. At the time of the engine start, normal pressure ignition is performed for the mixture, thereby earlier start of the engine is performed. Here, the normal pressure ignition means that the ECU 70 ignites not the mixture in the compressed state by the normal compression stroke, but to the mixture in the combustion chamber in the expansion stroke near the atmospheric state through the EFI.

Explaining the outline of the fifth embodiment, first, during the engine stop control, the stop time compression stroke cylinder and the stop time expansion stroke cylinder are estimated. When it is estimated that the #1 cylinder is in the expansion stroke and the #3 cylinder is in the compression stroke during the engine stop, for example, the ECU 70 performs the fuel injection to these cylinders, respectively, in the intake stroke just before the engine stop, and the mixture is sealed in each of the combustion chamber. Consequently, when the engine stops after the engine stop control is completed, the mixture is sealed and retained in the combustion chamber of each of the cylinder. In addition, the mixture becomes favorably atomized mixture by the reverse movement of the engine at the time of the engine stop, the convention effect by heat received from the cylinder and the like, and is in an easily ignitable state.

Consequently, when the engine start condition is established thereafter, the ECU 70 first drives the motor generator 3 to perform cranking, and starts to ignite the stop time compression stroke cylinder and the stop time expansion stroke cylinder. This enables to start the engine 2 by utilizing the explosion energy of the stop time expansion stroke cylinder in addition to the driving energy of the motor generator and the explosion energy of the stop time compression stroke cylinder, and hence the start of the engine 2 can be more quick and reliable.

Figure 19:
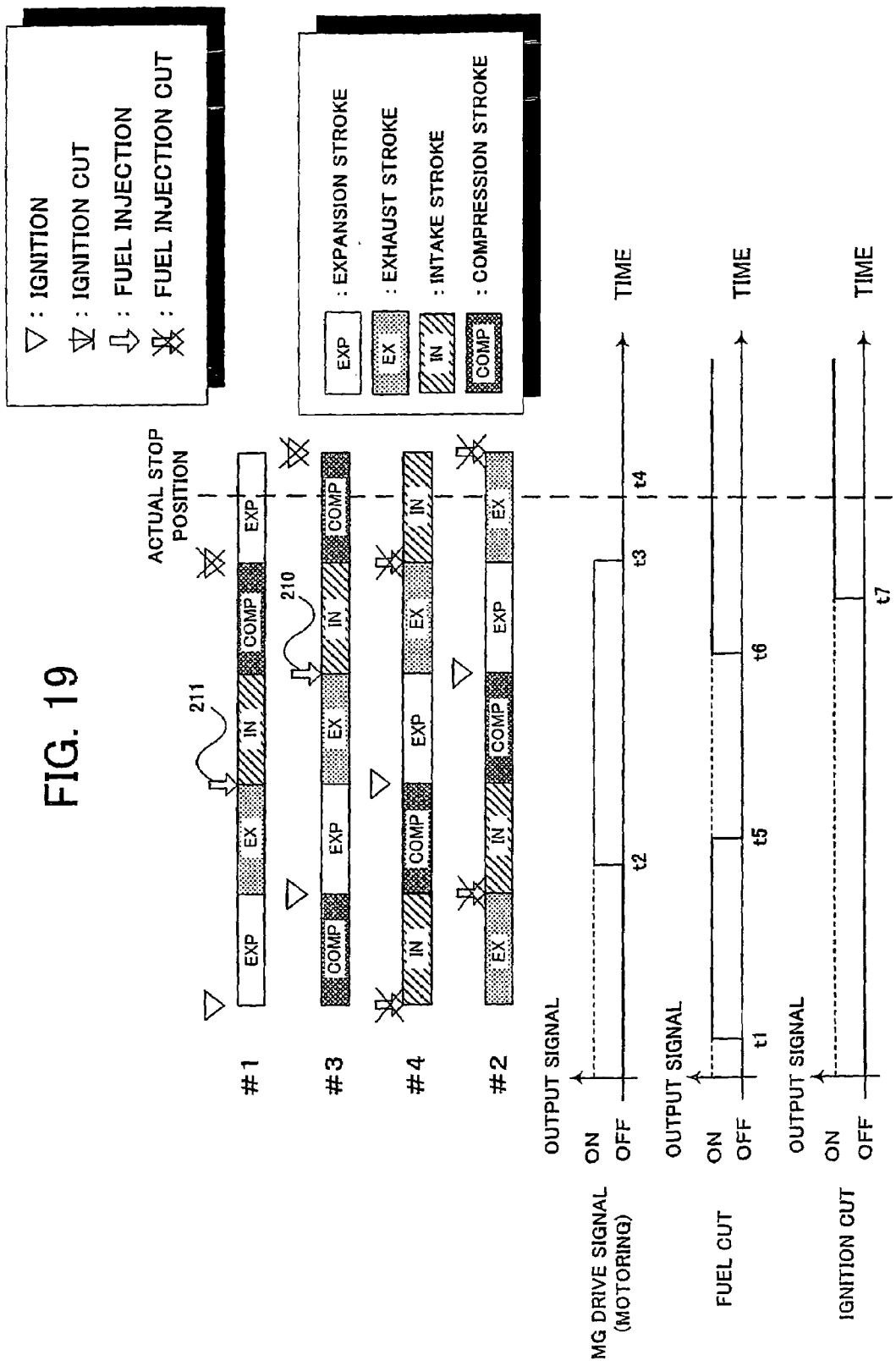
FIG. 19 shows an example of engine stop control according to a fifth embodiment of the present invention.

Next, an example of the engine stop control according to the fifth embodiment will be explained with reference to FIG. 19. As shown in FIG. 19, the engine stop control of the fifth embodiment is different from the engine stop control (see FIG. 15) according to the fourth embodiment in that the fuel injection is also performed for the #1 cylinder, which is the stop time expansion stroke cylinder, after the fuel cut is executed at the time t1. Namely, in the engine stop control, the fuel cut is executed at the time t1, and the motoring by the motor generator is started when the number of engine revolution goes down to a predetermined number at the time t2. Thereafter, the fuel cut is temporarily intermitted at the time t5 when the #1 cylinder which is the stop time expansion stroke cylinder is in the intake stroke just before the engine stop, and the fuel injection is performed for the #1 cylinder (arrow 211). Subsequently, the fuel injection is also performed for the #3 cylinder which is the stop time compression stroke cylinder (arrow 210), in the similar manner. When the fuel injection to these two cylinders is completed, the fuel cut is carried out again at the time t6. The motoring is finished at the time t3, and the engine stops at the time t4.

Figure 20:
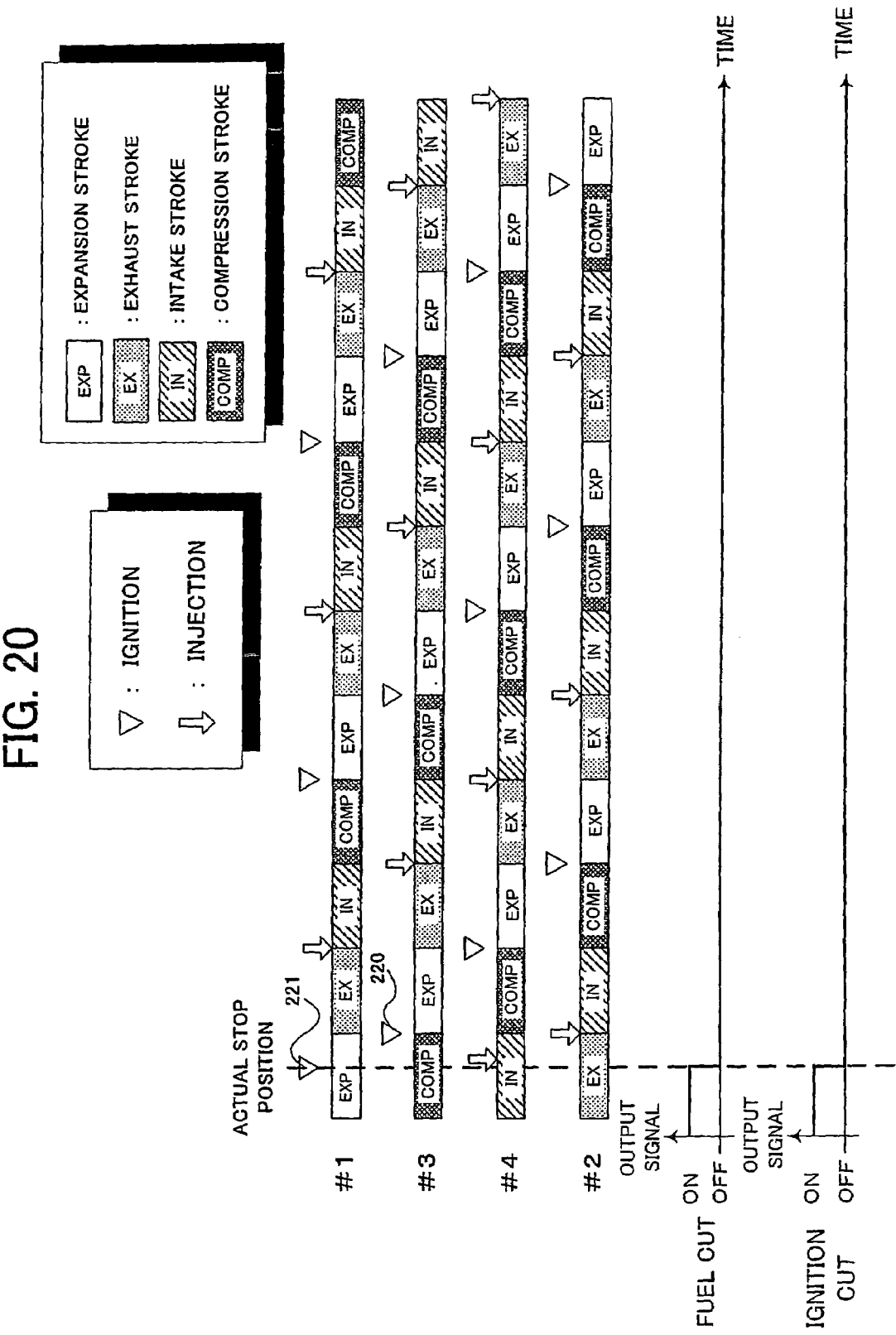
FIG. 20 shows an example of engine start control according to the fifth embodiment of the present invention.

Next, an example of the engine start control according to the fifth embodiment will be explained with reference to FIG. 20. In FIG. 20, when the engine start condition is established, the fuel cut signal is turned off to start the fuel injection, and the ignition cut signal is turned off to carry out the ignition. Since the mixture is sealed in the #3 cylinder which is the stop time compression stroke cylinder and the #1 cylinder which is the stop time expansion stroke cylinder during engine stop shown at the actual stop position in FIG. 20, the #1 cylinder is ignited (arrow 221) and the #3 cylinder is ignited (arrow 220) at the time of engine start, and the driving force by the explosion energy is generated. The explosion energy is added to the cranking by the motor generator, and therefore early start of the engine can be achieved.

Figure 21:
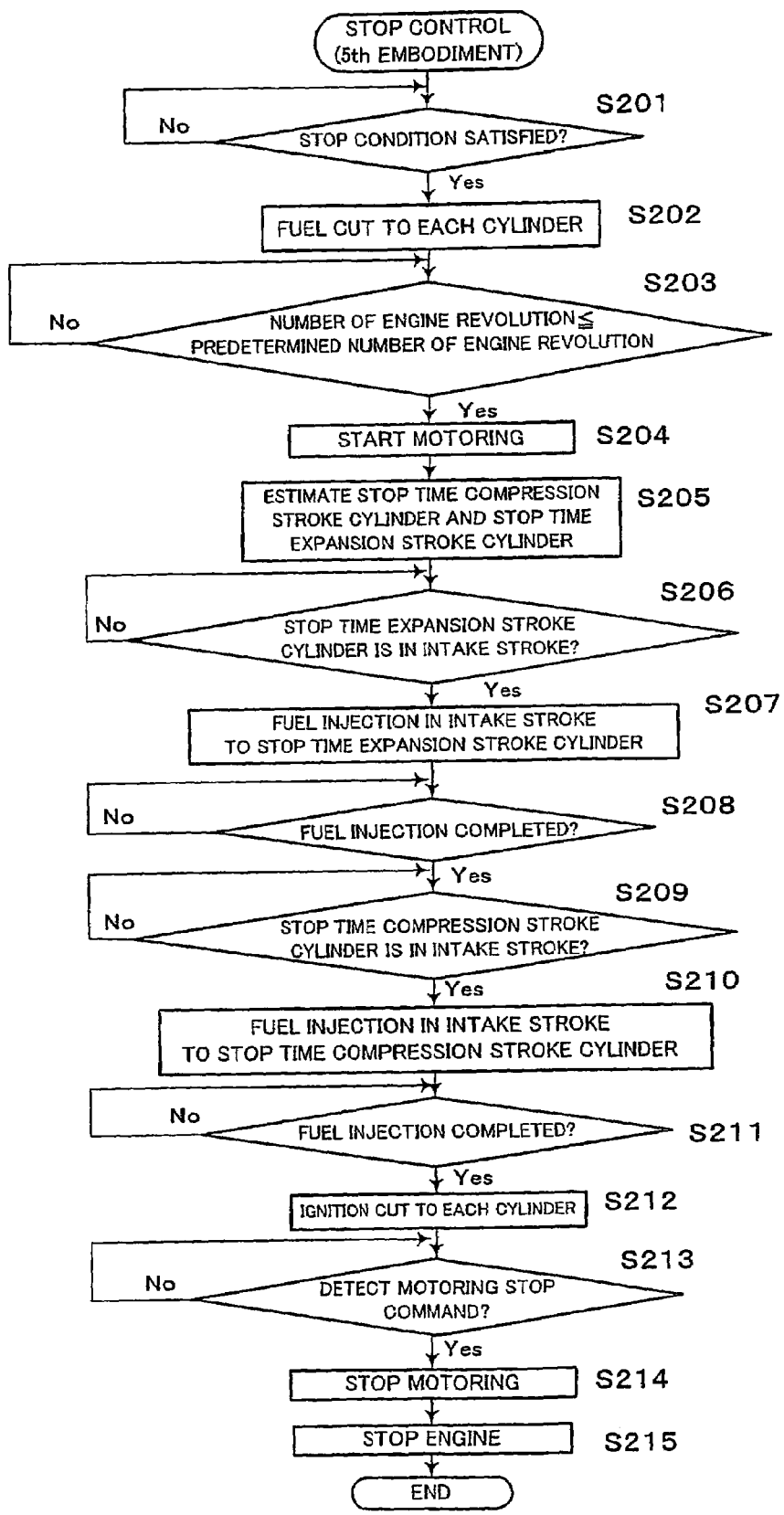
FIG. 21 is a flow chart of an engine stop control according to the fifth embodiment.

Next, the description will be given of a flow chart of the engine stop control according to the fifth embodiment, with reference to FIG. 21. FIG. 21 is the flow chart of the stop control according to the embodiment. It is noted that the ECU 70 basically executes the control, based on the output signal from various sensors. In the embodiment, the explanation will be given by simplifying the identical portions to the fourth embodiment.

Since steps S201 to S204 are identical to steps S71 to S74 in the flow chart of the stop control method according to the forth embodiment (see FIG. 17), the explanation is omitted.

Next, in step S205, the ECU 70 estimates the stop time compression stroke cylinder and the stop time expansion stroke cylinder, based on the cylinder determination signal at the time of the motoring start and the predetermined motoring execution time. In the embodiment, as explained with reference to FIG. 19, the ECU 70 estimates that #1 cylinder stops in the expansion stroke and #3 cylinder stops in the compression stroke at the time of the engine stop. Next, the ECU 70 constantly detects in which strokes #1 and #3 cylinders are at this time, based on the output signal from the cam angle sensor 92 and the like.

In step S206, the ECU 70 determines whether or not the stop time expansion stroke cylinder, i.e., the detected #1 cylinder, is in the intake stroke. When #1 cylinder is in the intake stroke, the processing moves to step S207, and the ECU 70 executes the fuel injection of the predetermined amount, to the stop time expansion stroke cylinder, i.e., #1 cylinder. When the fuel injection is completed, the processing moves to step S209 (step S208; Yes). Thereby, at the time of the engine stop, #1 cylinder stops with the mixture being introduced and sealed in the combustion chamber.

Figure 17:
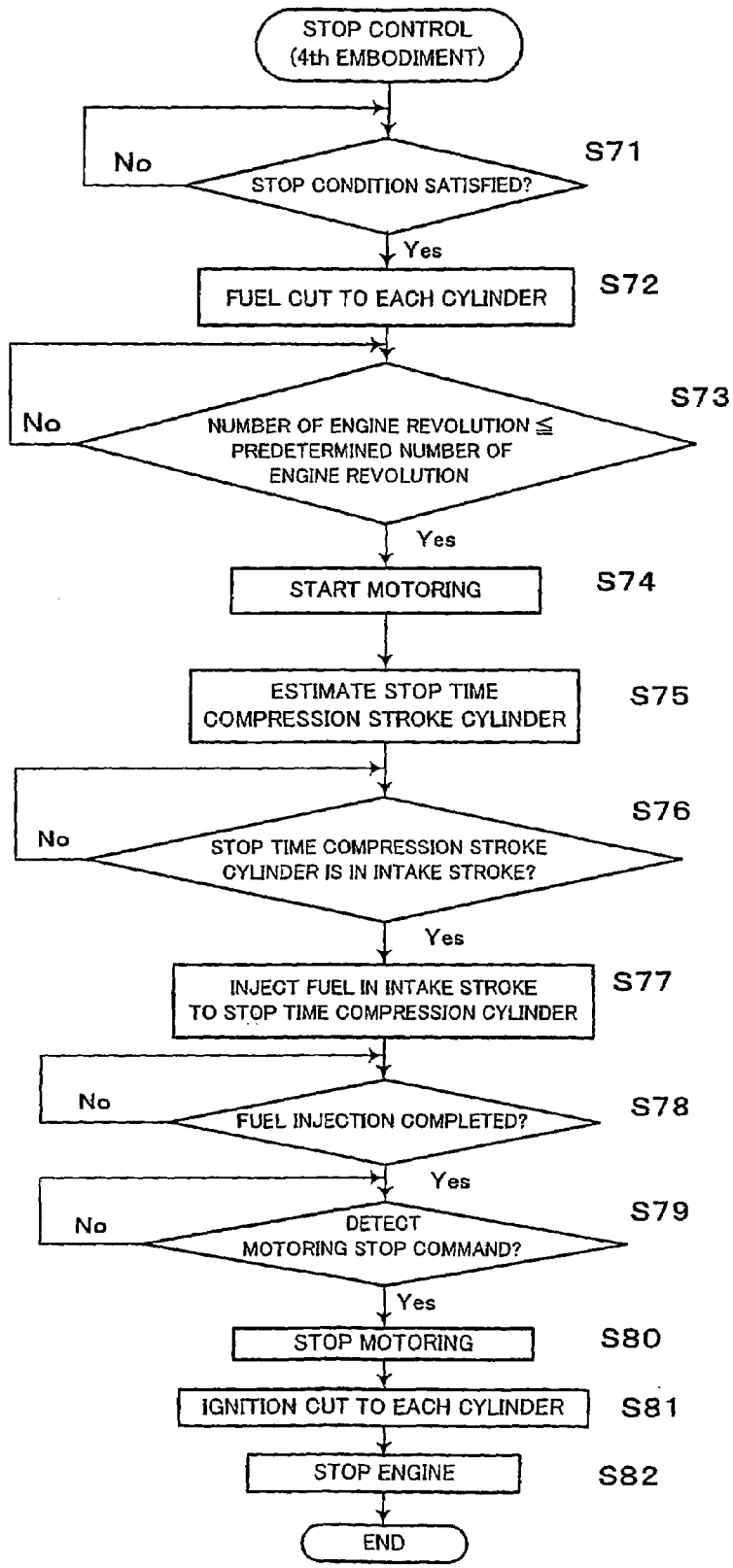
FIG. 17 is a flow chart of an engine stop control according to the fourth embodiment.

Steps S209 to S211 are identical to steps S76 to S78 of the flow chart of the stop control method according to the fourth embodiment (see FIG. 17). Namely, the ECU 70 executes the fuel infection of the predetermined amount in the intake stroke, to the stop time compression stroke cylinder, i.e., #3 cylinder. Thereby, at the time of the engine stop, #3 cylinder stops with the mixture being introduced and sealed in the combustion chamber.

Next, in step S212, the ECU 70 executes the ignition cut to each cylinder. In step S213, when the ECU 70 detects the motoring stop command signal from the motoring control unit 4, the ECU 70 stops the motoring (step S214). It is noted that the motoring stop command signal is transmitted from the motor control unit 4 to the ECU 70, when the predetermined motoring execution period lapses. Then, the engine 2 stops (step S215). In that way, when the engine stops, #1 cylinder is in the expansion stroke, and #3 cylinder is in the compression stroke. In this case, the mixture is introduced and sealed in both cylinders.

Figure 22:
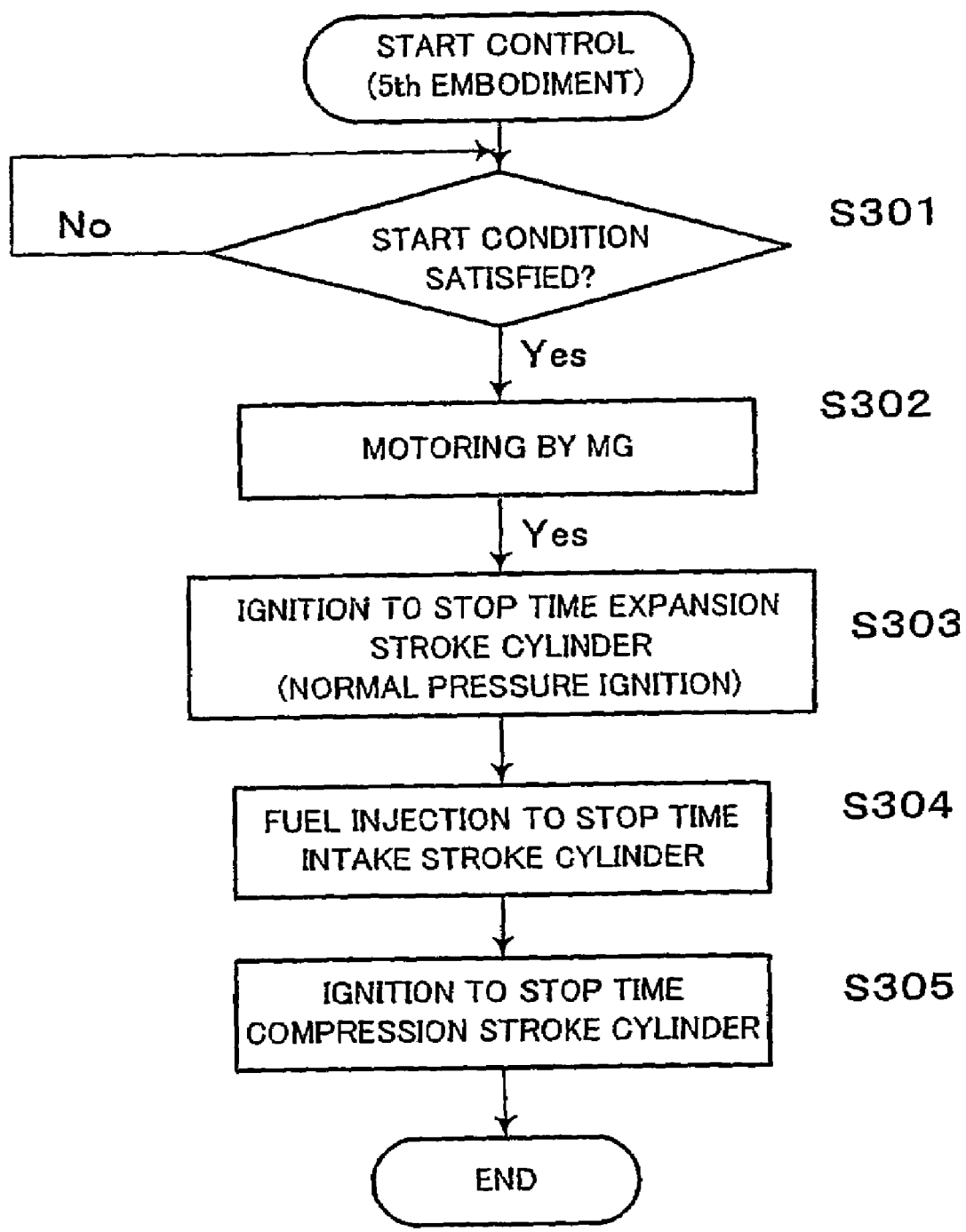
FIG. 22 is a flow chart of an engine start control according to the fifth embodiment.

Next, the description will be given of the engine start method according to the fifth embodiment. FIG. 22 is a flow chart of the engine start control according to the embodiment. It is noted that the ECU 70 basically executes the control, based on the output signal from various sensors. In the embodiment, the explanation will be given by simplifying the identical portions to the fourth embodiment.

In step S301, the ECU 70 determines whether or not the engine start condition is satisfied. When the engine start condition is satisfied, the ECU 70 starts the motoring by the motor generator 3 (step S302).

In step S303, the ECU 70 detects the stop time expansion stroke cylinder (#1 cylinder) based on the output signal from the cam angle sensor 92 and the like, and transmits the ignition command signal to the igniter to perform the ignition (normal pressure ignition) to the mixture in the combustion chamber of the stop time expansion stroke cylinder (#1 cylinder). Thereby, the driving force of the crankshaft is generated.

Based on the output signal from the cam angle sensor 92, the ECU 70 executes the fuel injection to the stop time intake stroke cylinder (step S304). Further, the ECU 70 performs the ignition to the stop time compression stroke cylinder (step S305). Since the mixture is introduced and sealed in the stop time compression stroke cylinder as mentioned above, the combustion starts at once, and the revolution of the crankshaft can be obtained by the explosion energy. In that way, the engine 2 starts.

As explained above, in the second embodiment, by estimating, during the engine stop control, the cylinders in the compression stroke and the expansion stroke at the time of the engine stop, the fuel is injected to those cylinders and the mixture is introduced and sealed in their combustion chambers. Thus, at the time of the engine start, it is possible that the combustion starts at once in the cylinders to enable the early start of the engine.

In the embodiment, the early engine start is realized by utilizing the explosion energy of the stop time expansion stroke cylinder, in addition to the cranking by the motor generator and the explosion energy of the stop time compression stroke cylinder. As explained above, at the time of the engine start, first, the cranking is executed by the motor generator. However, in a case of the drive by the motor generator, rise-up of exciting current becomes slow when the charged voltage of the battery driving the motor generator is low. At this time, it may take a relatively long time until the maximum torque of the motor generator can be outputted. At this point, like the embodiment, if the engine is started by utilizing the explosion energy of the stop time expansion stroke cylinder in addition to the energy of the motor generator, the explosion energy can be obtained at once at the time of the engine start. As understood from FIG. 20, this is because the combustion of the stop time expansion stroke cylinder is executed at once (arrow 221), though the combustion of the stop time compression stroke cylinder (expansion stroke) is executed later in time (arrow 220). Therefore, when the torque output by the motor generator is late reason, this embodiment is particularly advantageous in that the time until the engine start can be shortened by the explosion energy of the stop time expansion stroke cylinder.

While the above-described fifth embodiment is to generate the explosion energy at the time of the engine start by introducing the mixture in the stop time compression stroke cylinder and the stop time expansion stroke cylinder, it is also possible to utilize the explosion energy by introducing the mixture only in the stop time expansion stroke cylinder. The explosion energy of the stop time compression stroke cylinder is large because it utilizes the mixture in the compressed state, like the usual combustion. In contrast, in terms of the energy, the explosion energy of the stop time expansion stroke cylinder is small because it is the normal pressure ignition and the uncompressed mixture (like atmospheric pressure) is used. Therefore, it is preferred that the engine start is accelerated by adding the explosion energy of the stop time expansion stroke cylinder, in addition to utilizing the explosion of the stop time compression stroke cylinder according to the fourth embodiment.

3rd Embodiment

In the engine start control of the above-described fifth embodiment, first, the cranking by the motor generator is executed, and the engine start is accelerated by the explosion energy by igniting the stop time compression stroke cylinder and the stop time expansion stroke cylinder. Therefore, the cranking is executed by adding the explosion energy of the stop time expansion stroke cylinder to the driving force of the motor generator. However, when the first ignition (see the arrow 221 in FIG. 20) in the stop time expansion stroke cylinder is failed by a certain cause and ignition failure occurs, the cranking is executed only by the motor generator, without obtaining the explosion energy. In this case, if the motor generator is driven while the exciting current of the motor generator is not larger than a certain value, the torque needed for the cranking cannot be obtained, and the motor generator may be locked.

Therefore, in the third embodiment, the rotation start of the crankshaft by the explosion energy of the stop time expansion stroke cylinder, i.e., the variation of the crankshaft is detected, and if the crank angle is not varied during a certain time, the cranking is executed by the motor generator after the exciting current becomes larger than the predetermined value. When the crankshaft starts rotating by the explosion of the stop time expansion stroke cylinder, the motor generator is seldom locked, even though the exciting current of the motor generator is somewhat low and the torque is somewhat small. However, when the first ignition in the stop time expansion stroke cylinder is failed, the cranking is to be executed only by the motor generator. Therefore, in this case, the cranking by the motor generator is started in a state that the exciting current of the motor generator is larger than the predetermined value and the torque is obtained so that the motor generator is not locked.

If the cranking by the motor generator is started after confirming that the crank angle starts varying, there is another advantage as follows. If the cranking by the motor generator 3 is executed first, the volume of the combustion chamber of the stop time expansion stroke cylinder becomes larger and compression degree of the mixture sealed therein becomes smaller, because the crankshaft rotates in the normal direction and the piston operates. In addition, the exhaust valve gradually starts to open according to the operation of the piston in the stop time expansion stroke cylinder. Therefore, since the crankshaft is driven by the motor generator, the probability of the ignition failure becomes high, even though the normal pressure ignition of the stop time expansion stroke cylinder is executed. Also, even if the ignition failure is prevented, the combustion pressure obtained by executing the normal pressure ignition to the expansion stroke cylinder becomes smaller because the pressure of the mixture in the combustion chamber of the stop time expansion stroke cylinder becomes smaller. Thus, in this case, the probability that the engine start is failed becomes high, too. Therefore, in the embodiment, when the first normal pressure ignition of the stop time expansion stroke cylinder is failed and the variation of the crank angle is not detected, the cranking by the motor generator is not executed until sufficient torque can be obtained by the motor generator.

Figure 23:
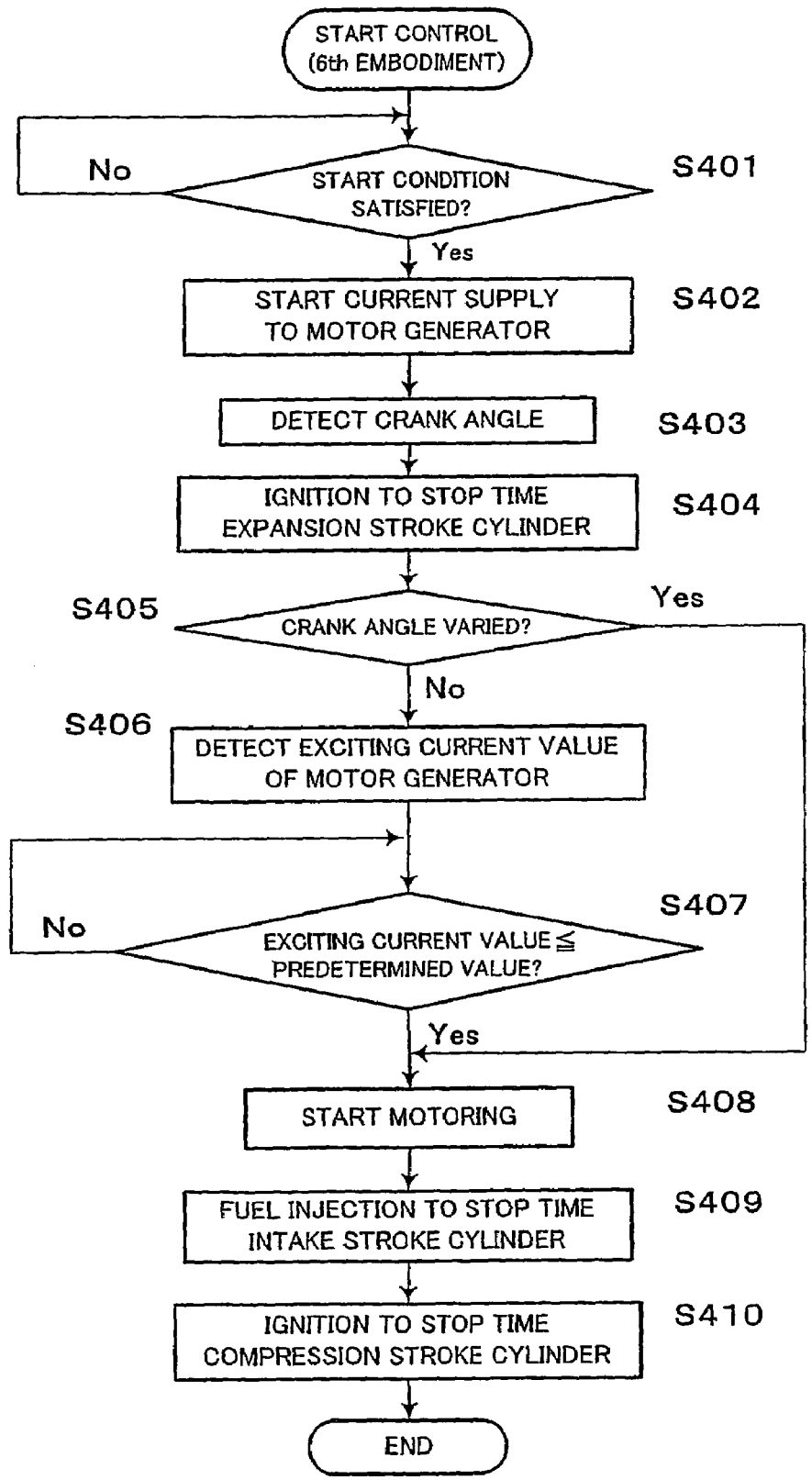
FIG. 23 is a flow chart of an engine start control according to a sixth embodiment of the present invention.

Next, the description will be given of a flow chart of the engine start control according to the sixth embodiment, with reference to FIG. 23. It is noted that the identical portions to the engine start control according to the fifth embodiment will be explained by simplifying. The ECU 70 basically executes the engine start control, based on the output signal from various sensors.

In step S401, the ECU 70 determines whether or not the engine start condition is satisfied. When the engine start condition is satisfied, current supply to the motor generator is started in step S402. However, the cranking by the motor generator is not executed yet at this time.

Next, in step S403, the ECU 70 detects the crank angle at the time of the engine stop, based on the output signal from the crank angle sensor 90 and the like. It is noted that this step can be omitted if the crank angle at the time of engine stop is known during the engine stop control. In step S404, the ECU 70 determines the stop time expansion stroke cylinder (#1 cylinder) based on the output signal from the cam angle sensor 92 and executes the ignition (normal pressure ignition).

In step S405, the ECU 70 determines whether or not the crankshaft starts the rotation by the normal pressure ignition in step S405. Concretely, first, the ECU 70 detects the crank angle after the normal pressure ignition, based on the output signal from the crank angle sensor 90 and the like. By comparing the crank angle thus detected with the crank angle detected in step S403, the ECU 70 determines whether or not the crank angle is varied to the predetermined angle. Thereby, the ECU 70 can determine whether or not the start of the engine 2 succeeds by the first explosion (normal pressure ignition) in the stop time expansion stroke cylinder (#1 cylinder). When the crank angle is varied, the processing moves to step S409 (step S 406; Yes) On the other hand, when the crank angle is not varied, or when the crank angle is not varied to the predetermined angle even though the crank angle is varied, the processing moves to step S407 (step S406; No).

When the processing moves to step S406, the ECU 70 detects the exciting current value of the motor generator 3 via the motor control unit 4. Next, the ECU 70 compares the exciting current value of the motor generator 3 detected in step S406 with the predetermined current value. Then, the ECU 70 determines whether or not the exciting current value of the motor generator 3 becomes larger than the predetermined current value (step S407). When the exciting current value of the motor generator 3 is lager than the predetermined current value, the processing moves to step S409 (step S408; Yes).

On the other hand, when the exciting current value of the motor generator 3 is smaller than the predetermined current value, the processing does not move to step S409 (step S408; No). Namely, the significance of the determination in step S408 is to confirm whether or not the outputting torque of the motor generator 3 becomes enough to rotate the crankshaft, by detecting the exciting current value of the motor generator 3 after the energizing thereof. Thereby, it can be prevented that the motor generator is locked as mentioned above.

In step S408, the ECU 70 starts the motoring by the motor generator 3 via the motor control unit 4. Thereby, the start of the engine 2 is reliably executed. Next, in step S409, the ECU 70 injects the fuel to the stop time intake stroke cylinder, and in step S401, the ignition is executed to the stop time compression stroke cylinder so that the explosion occurs, which generates the engine rotation torque. In that way, the engine starts.

As explained above, the control apparatus of the internal combustion engine of the present invention estimates the cylinder in the compression stroke and/or the expansion stroke at the time of the engine stop, and supplies the fuel into the cylinder via the intake port when the cylinder is in the intake stroke immediately before the engine stop. Thereby, at the time of the engine start, the time until the first explosion can be shortened and the engine start can be promptly executed by combusting the fuel introduced and sealed in the cylinder. Since the cranking by the motor is also executed at the same time, getting over the first and second top dead center becomes easy, while the lock of the motor can be effectively prevented. Thus, the engine start can be reliably executed.

[Modification]

Though the above description is directed to a port injection system, i.e., the case of the engine which executes the fuel injection via an injector provided in the intake port for convenience of explanation, the present invention can also be applied to a cylinder direct injection system, i.e., the engine which executes the fuel injection directly into the combustion chamber via the injector provided near the top of the piston head.

INDUSTRIAL APPLICABILITY

The control apparatus of the internal combustion engine according to the present invention can be utilized in a vehicle having the internal combustion engine as power, especially in a field of vehicles having so-called idling stop functions.

The invention claimed is:

1. A control apparatus of an internal combustion engine comprising:
a detecting unit that detects a number of revolutions of the internal combustion engine;
a combustion control unit that executes a fuel cut when the number of revolutions of the engine is at a predetermined value;
an inertia energy control unit that controls inertia energy of the engine, by using a motor for driving the engine, to be in a predetermined state in association with the fuel cut, at a timing in a process of stopping the engine; and
a stop control unit which stops the engine at a predetermined crank angle position by utilizing the inertia energy,
wherein the inertia energy control unit controls a number of revolutions of the engine to be within a range of a predetermined number of engine revolutions by performing a motoring of the engine for a predetermined time period using the motor, and
wherein the stop control unit stops the engine by terminating the motoring after the predetermined time period has passed.

2. The control apparatus of the internal combustion engine according to claim 1, wherein the combustion control unit increases a fuel injection amount when the number of revolutions of the engine is lower than the predetermined value.

3. The control apparatus of the internal combustion engine according to claim 1, wherein the predetermined time period of the motoring is a time for keeping the inertia energy of the engine constant.

4. The control apparatus of the internal combustion engine according claim 1, wherein the combustion control unit starts the combustion of the engine while driving by the motor is continued, when a starting request occurs in the engine in a condition that the number of engine revolution is controlled to be within the predetermined number of engine revolution by the motor.

5. The control apparatus of the internal combustion engine according to claim 1, wherein the stop control unit stops the engine at the predetermined crank angle position by adding control force to the engine by the motor for driving the engine.

6. The control apparatus of the internal combustion engine according to claim 5, wherein the stop control unit adds the control force to the engine by the motor for driving the engine when the engine is not estimated to stop at the predetermined crank angle position.

7. The control apparatus of the internal combustion engine according to claim 5, further comprising a detecting unit which detects a number of idling revolution of the engine, wherein the stop control unit inhibits stopping the engine when the number of idling revolution is larger than a predetermined value.

8. The control apparatus of the internal combustion engine according to claim 5, further comprising a detecting unit which detects the number of idling revolution, wherein the combustion control unit increases the combustion of the engine to increase the number of engine revolution before stopping the combustion of the engine when the number of idling revolution is smaller than the predetermined value.

9. The control apparatus of the internal combustion engine according claim 1, wherein the combustion control unit stops the combustion of the engine when the inertia energy control unit controls the number of engine revolution to be within the predetermined number of engine revolution.

10. The control apparatus of the internal combustion engine according to claim 1, further comprising a unit for reducing loads of the engine when the stop control unit performs an engine stop control.

11. The control apparatus of an internal combustion engine according to claim 1, further comprising:
a start control unit which drives the engine by the motor at a time of engine start;
an estimation unit which estimates a cylinder in a compression stroke or an expansion stroke at the time of the engine stop;
a detection unit which detects the cylinder;
a supplying unit which supplies fuel to the cylinder; and
a combustion unit which combusts the fuel supplied to the cylinder at the time of the engine start.

12. The control apparatus of the internal combustion engine according to claim 11, wherein the supplying unit supplies the fuel to the cylinder via an intake port, or directly supplies the fuel to the cylinder.

13. The control apparatus of the internal combustion engine according to claim 11, wherein the predetermined crank angle position is a stop position at which a torque of the motor needed at the time of the engine start becomes small.

14. The control apparatus of the internal combustion engine according to claim 11, wherein the engine stops at the predetermined crank angle position by the motor which controls a number of engine revolution to be within a predetermined number of engine revolution.

15. The control apparatus of the internal combustion engine according to claim 11, wherein the supplying unit supplies the fuel to the cylinder when the cylinder which is detected based on the detection unit immediately before the time of the engine stop is in the intake stroke.

16. The control apparatus of the internal combustion engine according to claim 11, wherein the start control unit starts the engine by driving the motor when a current value added to the motor is larger than a predetermined value at the time of the engine start.

17. The control apparatus of the internal combustion engine according to claim 11, wherein the estimation unit estimates the cylinder which is in the compression stroke and/or the expansion stroke, based on the number of engine revolution at a time of stopping driving by the motor.

18. The control apparatus of the internal combustion engine according to claim 11, wherein the estimation unit estimates the cylinder which is in the compression stroke and/or the expansion stroke, based on the number of engine revolution at the time of stopping driving by the motor and a kind of the stroke of each cylinder at a time of starting driving by the motor.

19. The control apparatus of the internal combustion engine according to claim 18, wherein the estimation unit specifies the kind of the stroke of each cylinder, based on a cam position of the cylinder.

* * * * *